United States Patent [19]

Young

[11] Patent Number: 4,642,537

[45] Date of Patent: Feb. 10, 1987

[54] LAUNDERING APPARATUS

[75] Inventor: Glen C. Young, Fort Wayne, Ind.

[73] Assignee: General Electric Company, Fort Wayne, Ind.

[21] Appl. No.: 561,047

[22] Filed: Dec. 13, 1983

[51] Int. Cl.$^4$ .............................................. H02P 6/02
[52] U.S. Cl. .................................... 318/254; 318/138; 318/439; 318/696
[58] Field of Search ................... 318/138, 254, 254 A, 318/439, 696

[56] References Cited

U.S. PATENT DOCUMENTS

| | | | |
|---|---|---|---|
| 3,369,381 | 2/1968 | Crane et al. | 68/12 |
| 3,599,062 | 8/1971 | Crane et al. | 318/128 |
| 4,005,347 | 1/1977 | Erdman | 318/254 |
| 4,027,215 | 5/1977 | Knight et al. | 318/341 |
| 4,080,553 | 3/1978 | Lyman | 318/138 |
| 4,132,930 | 1/1979 | Schalk | 318/254 X |
| 4,162,435 | 7/1979 | Wright | 318/138 |
| 4,167,693 | 9/1979 | Liska et al. | 318/138 |
| 4,169,990 | 10/1979 | Erdman | 318/138 |
| 4,238,717 | 12/1980 | Knight et al. | 318/341 |
| 4,250,435 | 2/1981 | Alley | 318/138 |
| 4,250,544 | 2/1981 | Alley | 364/110 |
| 4,282,471 | 8/1981 | Budniak et al. | 318/685 |
| 4,327,302 | 4/1982 | Hershberger | 310/156 |
| 4,390,826 | 6/1983 | Erdman et al. | 318/439 |
| 4,403,177 | 9/1983 | Weber et al. | 318/254 |
| 4,415,845 | 11/1983 | Oudet | 318/696 |
| 4,446,406 | 5/1984 | Uzuka | 318/254 |
| 4,449,079 | 5/1984 | Erdman | 318/254 X |
| 4,459,519 | 7/1984 | Erdman | 318/334 X |

FOREIGN PATENT DOCUMENTS

| | | | |
|---|---|---|---|
| 2251094 | 10/1972 | Fed. Rep. of Germany | 318/16 |
| 2450968 | 5/1975 | Fed. Rep. of Germany | 318/138 |
| 55-26064 | 2/1980 | Japan | 318/254 |
| WO83/00781 | 3/1983 | PCT Int'l Appl. | 318/254 |
| 2119185 | 11/1983 | United Kingdom . | |

Primary Examiner—William M. Shoop, Jr.
Assistant Examiner—Bentsu Ro
Attorney, Agent, or Firm—Ralph E. Krisher, Jr.

[57] ABSTRACT

Control system for an electronically commutated motor includes circuitry for integrating the back emf of an unenergized motor winding to determine motor rotor position. However, integration should not occur on a field collapse voltage which precedes the back emf. A zero-approaching detector enables the integration of the back emf only when a zero-approach occurs at the ending of the field collapse voltage. The integration is also inhibited from being spuriously enabled by zero approaches for a predetermined length of time after commutation and prior to the ending of the field collapse voltage. A system for controlling the average voltage cyclically applied to a load such as an electronically commutated DC motor includes circuitry for generating a direct function of the applied voltage. The function is compared to a reference by a comparator which indicates when the function reaches the reference. The end of each voltage cycle is signaled when the function of the applied voltage reaches a predetermined value. The external application of voltage to the load is terminated when the function of the applied voltage reaches the reference, and each voltage cycle is terminated when the function of the applied voltage reaches the predetermined value.

89 Claims, 12 Drawing Figures

LAUNDERING APPARATUS

FIELD OF THE INVENTION

This invention relates in general to dynamoelectric machines and domestic appliances and more particularly to a control system with special applicability to an electronically commutated motor, a method of operating an electronically commutated motor, and a laundering apparatus.

BACKGROUND OF THE INVENTION

While conventional brush-commutated DC motors may have numerous advantageous characteristics such as convenience of changing operational speeds and direction of rotation, it is believed that there may be disadvantages, such as brush wear, electrical noise or RF interference caused by sparking between the brushes and the segmented commutator, that may limit the applicability of such brush-commutated DC motors in some fields such as the domestic appliance field. Electronically commutated motors, such as brushless DC motors and permanent magnet motors with electronic commutation, have now been developed and generally are believed to have the above discussed advantageous characteristics of the brush-commutated DC motors without many of the disadvantages thereof while also having other important advantages. Such electronically commutated motors are disclosed in the David M. Erdman U.S. Pat. Nos. 4,005,347 and 4,169,990 and Floyd H. Wright U.S. Pat. No. 4,162,435, all of which are commonly assigned with the present application. These electronically commutated motors may be advantageously employed in many different fields or motor applications among which are domestic appliances, e.g., automatic washing or laundry machines such as disclosed in commonly assigned, co-pending U.S. patent applications Ser. No. 412,421 filed Aug. 27, 1982, now U.S. Pat. No. 4,449,079; Ser. No. 367,951 filed Apr. 13, 1982; Ser. No. 400,319 filed July 21, 1982; Ser. No. 191,056 filed Sept. 25, 1980, now U.S. Pat. No. 4,459,519; Ser. No. 141,268 filed Apr. 17, 1980, now U.S. Pat. No. 4,390,826; Ser. No. 077,784 filed Sept. 21, 1979, now U.S. Pat. No. 4,327,302; and Ser. No. 463,147 filed Feb. 2, 1983.

Coassigned U.S. Pat. No. 4,250,544, Combination Microprocessor and Discrete Element Control System for a Clock Rate Controlled Electronically Commutated Motor issued Feb. 10, 1981, to R. P. Alley is incorporated herein by reference.

Application Ser. No. 463,147 to David M. Erdman is also related to the present application and is incorporated herein by reference.

Laundry machines as disclosed in the above patents and applications are believed to have many significant advantages over the prior art laundry machines which employ various types of transmissions and mechanisms to convert rotary motion into oscillatory motion to selectively actuate the machine in its agitation or washing mode and in its spin extraction mode. Such prior art laundry machines are believed to be more costly and/or complicated to manufacture, consume more energy, and require more servicing. Laundry machines with electronically commutated motors require no mechanical means, other than mere speed reducing means, to effect oscillatory action of the agitator, and in some applications, it is believed that the spin basket might be directly driven by such a motor. While the past control systems, such as those disclosed in the aforementioned coassigned applications for instance, undoubtedly illustrated many features, it is believed that the control systems for electronically commutated motors in general, and for such motors utilized in laundry machines, could be improved. In some of the past control systems, the position of the rotatable assembly (i.e., the rotor) of the electronically commutated motor was located by sensing the back emf of one of the winding stages on the stationary assembly (i.e., the stator) thereof. More particularly the back emf of an unenergized winding stage was sensed and integrated to determine rotor position. However, the voltage measured at the terminal of an unenergized winding has several components other than that induced by the rotation of the rotor. Immediately after a winding is commutated off, the voltage at the terminal of the now unenergized winding crosses zero. Thereafter the voltage is of the same polarity as the anticipated back emf at the end of the commutation period, but it is not due to back emf. Rather, current which had been in the winding while it was energized induces this field collapse voltage, so it is not an accurate measure of rotor position. This field collapse voltage may last for several electrical degrees, but its actual duration is highly motor and load dependent. Some of the previous applications disclose locking out the integrator for a predetermined number of electrical degrees of rotation, e.g., 20°, to prevent the current-induced voltage from being integrated. This has been done successfully by basing the measurement of the lockout interval upon the immediately previous interval between commutations. However, during rapid speed changes, it is believed that this approach can result in lockout times which are longer than 60 electrical degrees or less than the commutation current interval, both of which may result in a loss of position sensing and in less than desirable motor operation. A system which ignores these commutation current-induced voltages and avoids the problems which may result from locking out the integrator for a supposedly constant number of electrical degrees would be desirable.

The speed of an electrically commutated motor is directly correlated to the average voltage applied to the windings, which in turn is determined by the unregulated DC voltage applied to the motor windings and the duty cycle of the pulse width modulation used to apply the voltage. The duty cycle is in turn a function of the total time the windings are energized each cycle divided by the length of each cycle. The windings are typically energized until some function of the supply voltage, such as the integral, equals some preset reference selected to give the desired average voltage. When this reference is reached, the winding drive is shut off. The length of the cycle has been separately determined, usually by a separate clock circuit. In economical circuits, both the generation of the function of applied voltage and the measurement of the cycle length are believed to introduce error into the average voltage applied. Use of inexpensive low precision capacitors for each function in some cases may result in significant error in average voltage applied, and hence in motor speed. Conversely, higher precision capacitors are undesirably expensive for use in a control system which is to be widely and economically used. Thus, it would be desirable to have a control system which uses relatively low precision components yet which accurately controls average applied voltage and motor speed.

SUMMARY OF THE INVENTION

Among the several objects and features of this invention may be noted the provision of an improved electronically commutated motor (ECM), an improved method of operating an ECM, an improved laundry machine, and an improved control system for an ECM which overcome the above discussed disadvantageous features, as well as others, of the prior art; the provision of such improved ECM, method of operating such ECM, improved laundry machine, and improved control system which more accurately and reliably effects the sensing and control of rotor position in such ECM; the provision of such improved ECM, improved method of operating an ECM, improved laundry machine and improved control system for an ECM which reliably controls such motors and laundry machines at very low rotor speeds as upon startup and reversal when rapid speed changes occur; the provision of such improved ECM, improved method of operating an ECM, improved laundry machine, and improved control system for an ECM which operates with a wide variety of motors and over a wide range of loads; the provision of methods and systems for accurately controlling the average voltage cyclically applied to a load such methods and systems being applicable in an improved ECM, an improved method of operating an ECM, an improved laundry machine, and an improved control system for an ECM; the provision of such methods and systems in which either high or low precision components can be employed; the provision of an ECM and an improved laundry machine, an improved method of operating an ECM and an improved control system for an ECM which is relatively efficient over a wide range of loads; the provision of such improved ECM, improved method of operating an ECM, an improved laundry machine, and an improved control system for an ECM which operates at an accurate speed; the provision of an improved ECM, an improved method of operating an ECM, an improved laundry machine, and an improved control system for an ECM which operates at accurately controlled rates and which is relatively economical in cost; and the provision of an improved ECM, an improved method of operating an ECM, an improved laundry machine, and an improved control system for an ECM which accurately controls speed and rotor position. These as well as other objects and advantageous features of the present invention will be in part apparent and in part pointed out hereinafter.

In general, the inventive control system for an electronically commutated motor adapted to be energized from a DC power source and including a stationary assembly having a plurality of winding stages adapted to be electronically commutated in at least one preselected sequence, and a rotatable assembly associated in selective magnetic coupling relation with the winding stages, each winding stage having a terminal associated therewith, in one form of the invention, comprises circuitry operable for electronic commutation of at least one at a time of the winding stages of the electronically commutated motor by applying thereto a DC voltage from the power source in the at least one preselected sequence to effect the energization of the electronically commutated motor and the rotation of the rotatable assembly. At least one other of the winding stages during any one commutation exhibits a terminal voltage including a back emf and a field collapse voltage ending prior to appearance of the back emf. In addition, circuitry is provided for generating a direct function of the terminal voltage during each commutation in response to its first approach to zero at the ending of the field collapse voltage and effecting the operation of the electronic commutation circuitry when the direct function of the terminal voltage thereafter reaches a predetermined level during each same commutation.

In another form of the invention the control system for an electronically commutated motor adapted to be energized from a DC power source and including a stationary assembly having a plurality of winding stages adapted to be electronically commutated in at least one preselected sequence, and a rotatable assembly associated in selective magnetic coupling relation with the winding stages, each winding stage having a terminal associated therewith comprises circuitry operable generally for electronic commutation of at least some of the winding stages of the electronically commutated motor by applying thereto a DC voltage from the power source in the at least one preselected sequence to effect the energization of the electronically commutated motor and the rotation of the rotatable assembly. Circuitry is provided operable generally for receiving and integrating the terminal voltage of at least one of the winding stages. The terminal voltage includes at least the back emf of the at least one winding stage and a field collapse signal ending prior to appearance of the back emf. Circuitry responsive to a predetermined output level of the integrating circuitry generates a commutation signal for a predetermined length of time, the predetermined length of time expiring before the ending of the field collapse signal. Additional circuitry responsive to the commutation signal effects the operation of the electronic commutation circuit and inhibits the operation of the integrating circuit for the predetermined length of time and initiates the operation of the integrating circuit when the terminal voltage of the at least one winding stage first approaches zero after the predetermined length of time.

The invention also involves a control system for an electronically commutated motor adapted to be energized from a DC power source and including a stationary assembly having a plurality of winding stages adapted to be electronically commutated in at least one preselected sequence, and a rotatable assembly associated in selective magnetic coupling relation with the winding stages, each winding stage having a terminal associated therewith, comprising circuitry operable generally for electronic commutation of at least one at a time of the winding stages of the electronically commutated motor by applying thereto a DC voltage from the power source in the at least one preselected sequence to effect the energization of the electronically commutated motor and the rotation of the rotatable assembly. At least one other of the winding stages during any one commutation exhibits a terminal voltage including a back emf and a field collapse voltage ending prior to appearance of the back emf. Also a circuit is provided operable generally for integrating the terminal voltage of the at least one other winding stage during any one commutation. Another circuit responds to a predetermined output level of the integrating circuit for generating a commutation signal for effecting the operation of the electronic commutation circuitry. A circuit is provided for controlling the integrating circuit and is responsive to the commutation signal to disable the integrating circuit. Further circuitry is provided for comparing the field collapse voltage with a predetermined level and, upon the field collapse voltage falling below a predetermined level, causing the controlling circuit to enable the operation of the integrating circuit.

A method of operating an electronically commutated motor adapted to be energized from a DC power source and including a stationary assembly having a plurality of winding stages adapted to be electronically commutated in at least one preselected sequence, and a rotatable assembly associated in selective magnetic coupling relation with the winding stages, each winding stage having a terminal associated therewith, inventively comprises the steps of commutating in response to a commutating signal at least some of the winding stages by applying a DC voltage thereto in the at least one preselected sequence to effect the energization of the electronically commutated motor and the rotation of the rotatable assembly; generally integrating the terminal voltage of at least one of the winding stages, the terminal voltage including at least the back emf of the at least one winding stage and also including a field collapse voltage ending prior to appearance of the back emf; generating the commutation signal when the integrating reaches a predetermined level; and initiating the integrating in response to a first approach to zero at the ending of the field collapse voltage.

An electronically commutated motor according to the invention adapted to be energized from a DC power source comprises a stationary assembly having a plurality of winding stages adapted to be electronically commutated in at least one preselected sequence, a rotatable assembly associated in selective magnetic coupling relation with the winding stages, and a control system including circuitry operable generally for electronic commutation of at least some of the winding stages of the electronically commutated motor by applying thereto a DC voltage from the power source in the at least one preselected sequence to effect the energization of the electronically commutated motor and the rotation of the rotatable assembly. Also circuitry is provided operable generally for integrating a voltage across an unenergized one of the winding stages in each commutation period. The unenergized winding voltage includes a back emf and a field collapse voltage ending prior to the back emf. In addition, circuitry is provided responsive to a predetermined output level of the integrating circuit for effecting the operation of the electronic commutation circuitry and for preventing the operation of the integrating circuitry after the commencement of commutation of the at least some winding stages until the ending of the field collapse signal.

In general, a laundering apparatus according to the invention comprises in combination equipment for agitating water or other fluid and fabrics to be laundered thereby to wash or otherwise launder the fabrics and for thereafter spinning the fabrics to effect centrifugal displacement of water or other fluid from the fabrics, and an electronically commutated motor comprising a stationary assembly having a plurality of winding stages adapted to be electronically commutated in at least one preselected sequence, and a rotatable assembly associated in selective magnetic coupling relation with the winding stages for driving the equipment for agitating and spinning. The laundering apparatus also includes circuitry operable generally for effecting the electronic commutation of at least some of the winding stages of the electronically commutated motor by applying a DC voltage thereto in the at least one preselected sequence to effect the energization of the electronically commutated motor and the rotation of the rotatable assembly, the terminal voltage of at least one other of the winding stages during any one commutation including a back emf and a field collapse voltage ending prior to appearance of the back emf. Further circuitry is provided for generating a function of the terminal voltage during each commutation in response to its first approach to zero at the ending of the field collapse voltage and effecting the operation of the electronic commutation circuitry when the function of the terminal voltage thereafter reaches a predetermined level during each same commutation.

Another form of inventive control system for an electronically commutated motor adapted to be energized from a DC power source and including a stationary assembly having a plurality of winding stages adapted to be electronically commutated in at least one preselected sequence, and a rotatable assembly associated in selective magnetic coupling relation with the winding stages, each winding stage having a terminal associated therewith, comprises circuitry operable generally for effecting the electronic commutation of at least some of the winding stages of the electronically commutated motor by applying thereto a DC voltage from the power source in the at least one preselected sequence to effect the energization of the electronically commutated motor and the rotation of the rotatable assembly whereby a motoring condition is achievable. Circuitry is also provided operable generally for integrating the terminal voltage of at least one of the winding stages, the terminal voltage having a higher magnitude part followed by a lower magnitude back emf part under the motoring condition. Also circuitry responds to a predetermined output level of the integrating circuitry for generating a commutation signal, and additional circuitry inhibits the operation of the integrating circuitry until the terminal voltage of the at least one winding stage falls in magnitude below a selected level selected to exceed that of the back emf under the motoring condition.

An inventive system for controlling the average voltage cyclically applied to a load comprises circuitry for generating a direct function of the applied voltage, circuitry for comparing the function of the applied voltage to a reference and for indicating when the function reaches the reference, circuitry for signaling the end of each voltage cycle when the function of the applied voltage reaches a predetermined value, and circuitry responsive to the comparing circuitry and to the signaling circuitry for terminating application of voltage to the load when the function of the applied voltage reaches the reference and for terminating each voltage cycle when the function of the applied voltage reaches the predetermined value.

A method of controlling the average voltage cyclically applied to a load inventively comprises the steps of generating a direct function of the applied voltage, terminating application of voltage to the load when the function of the applied voltage reaches a first predetermined value selected to represent a desired average voltage, and terminating each voltage cycle when the function of the applied voltage reaches a second predetermined value.

An inventive control system for an electronically commutated DC motor having a stationary assembly with a plurality of winding stages and a rotatable assembly arranged in selective magnetic coupling relation therewith comprises circuitry responsive to a set of control signals for commutating the winding stages by cyclically applying a DC voltage thereto in at least one preselected sequence to cause rotation of the rotatable assembly, circuitry for generating a direct function of the applied voltage, circuitry for comparing the function of the applied voltage to a reference and for indicating when the function reaches a reference, circuitry for signaling the end of each voltage cycle when the function of the applied voltage reaches a predetermined value, and circuitry responsive to the comparing circuitry and to the signaling circuitry for terminating application of voltage to the motor when the function of the applied voltage reaches the reference and for terminating each voltage cycle when the function of the applied voltage reaches the predetermined value.

A method of controlling the average voltage cyclically applied to an electronically commutated motor inventively comprises the steps of generating a direct function of the applied voltage, terminating application of voltage to the motor when the function of the applied voltage reaches a first predetermined value selected to represent a desired average voltage, and terminating each voltage cycle when the function of the applied voltage reaches a second predetermined value.

Another form of the inventive laundering apparatus comprises in combination equipment for agitating water or other fluid and fabrics to be laundered thereby to wash or otherwise launder the fabrics and for thereafter spinning the fabrics to effect centrifugal displacement of water or other fluid from the fabrics; an electronically commutated DC motor, the motor comprising a stationary assembly having a plurality of winding stages adapted to be electronically commutated in at least one preselected sequence, and a rotatable assembly associated in selective magnetic coupling relation with the winding stages for driving the equipment for agitating and spinning; a control system connected to the motor; and a circuit for applying a DC voltage to the control system. The control system includes circuitry operable generally for effecting the electronic commutation of at least some of the winding stages of the electronically commutated motor by applying the DC voltage thereto in the at least one preselected sequence to effect the energization of the electronically commutated motor and the rotation of the rotatable assembly. Circuitry is also provided for generating a function of the applied voltage. Also circuitry compares the function of the applied voltage to a reference and indicates when the function reaches the reference. Circuitry signals the end of each voltage cycle when the function of the applied voltage reaches a predetermined value. Additional circuitry responds to the comparing circuitry and to the signaling circuitry for terminating application of voltage to the motor when the function of the applied voltage reaches the reference and terminates each voltage cycle when the function of the applied voltage reaches the predetermined value.

BRIEF DESCRIPTION OF THE DRAWINGS

Corresponding reference characters refer to corresponding parts throughout the several views of the drawings.

The exemplifications set out herein illustrate preferred embodiments of the invention in one form thereof, and such exemplifications are not to be construed as limiting the scope of the invention in any manner.

DETAILED DESCRIPTION OF THE PREFERRED EMBODIMENT

Figure 1:
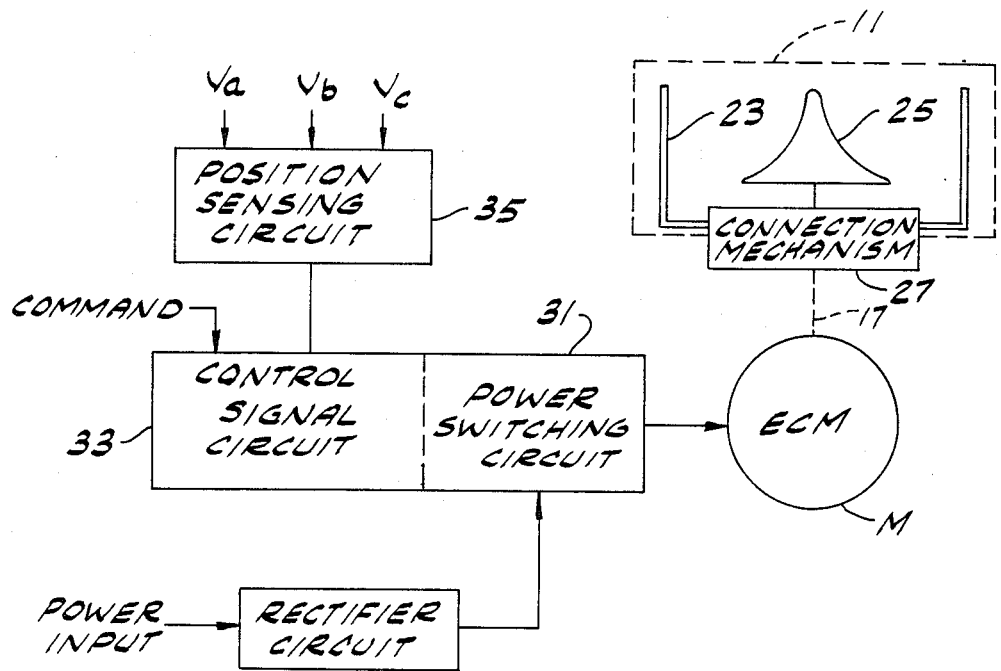
FIG. 1 is block-diagrammatic schematic showing the major components control system of this invention in combination with an electronically commutated motor driving a laundry machine.
Figure 2:
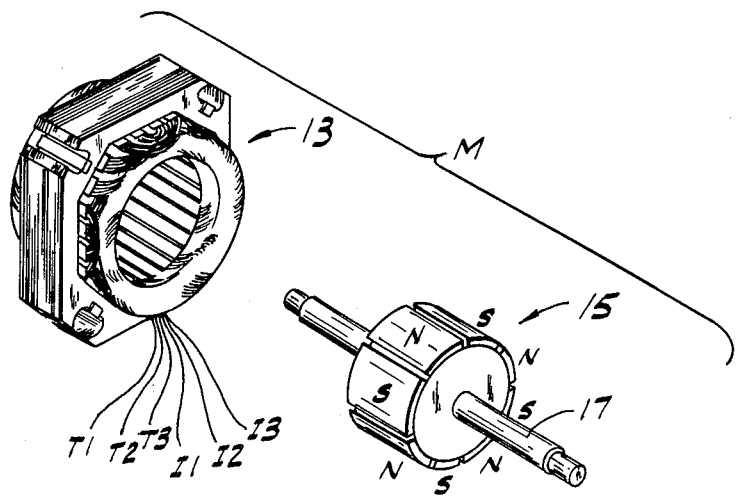
FIG. 2 is an exploded, perspective view of the main elements of an commutated DC motor which is controllable by control system of the present invention.
Figure 3:
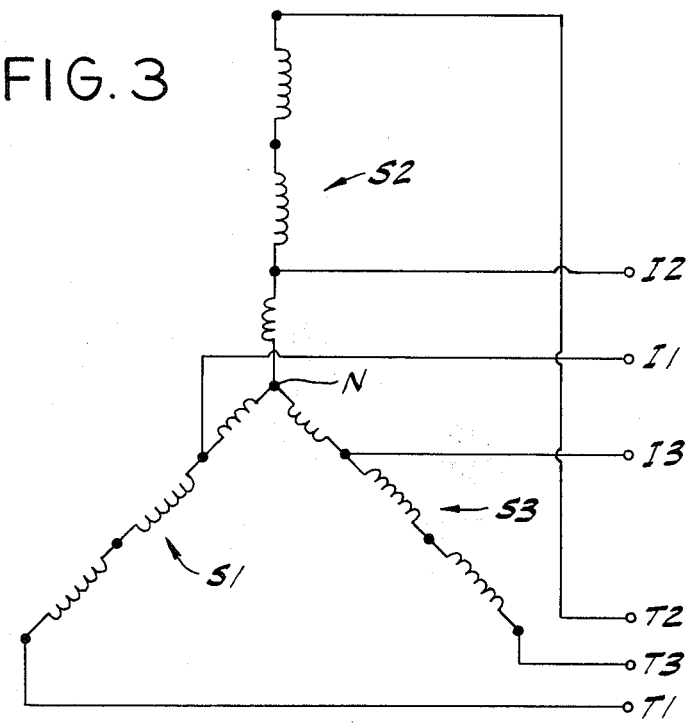
FIG. 3 is a schematic diagram showing the winding stages and terminals of the motor of FIG. 2.

Referring now to the drawings, and more particularly to FIG. 1, a laundry machine 11 in one form of the invention is illustrated schematically. Laundry machine or laundering apparatus 11 includes an electronically commutated motor (ECM) M adapted to be energized from a DC power source and having (see FIG. 2) a stationary assembly including a stator or core 13 and a rotatable assembly including a permanent magnet rotor 15 and a shaft 17. Stator 13 includes a plurality (e.g., three) of winding stages S1, S2 and S3 (FIG. 3) adapted to be electronically commutated in at least one preselected sequence, although the invention is not limited to that particular number of winding stages. Two sets of terminals $I_1$, $I_2$, $I_3$ and $T_1$, $T_2$, $T_3$ for two different speed ranges of operation of motor M are shown, there being at least one terminal associated with each winding stage.

When the winding stages S1, S2, S3 are energized in a temporal sequence, six sets of eight magnetic poles are established that will provide a radial magnetic field which moves clockwise or counterclockwise around the stator bore depending on the preselected sequence or order in which the stages are energized. This moving field intersects with the flux field of the permanent magnet rotor to cause the rotor 15 to rotate relative to the stator 13 in the desired direction to develop a torque which is a direct function of the intensities or strengths of the magnetic fields. If a more detailed description of the construction of electronically commutated motor M is desired, reference may be had to the aforementioned U.S. patent application Ser. No. 367,951 filed Apr. 13, 1982 to John H. Boyd, Jr., which is incorporated herein by reference.

Further, while electronically commutated motor M is illustrated herein for purposes of disclosure, it is contemplated that other such motors of different constructions and/or different winding arrangements may be utilized in one or another form of the invention so as to meet at least some of the objects thereof.

The winding stages of motor M, as explained in the aforementioned David M. Erdman U.S. patent application Ser. No. 463,147, filed Feb. 2, 1983, are commutated without brushes by sensing the rotational position of the rotatable assembly or rotor 15 as it rotates within the bore of stator 13 and utilizing electrical signals generated as a function of the rotational position of the rotor to sequentially apply a DC voltage to each of the winding stages in different preselected orders or sequences that determine the direction of the rotation of the rotor. Position sensing may be accomplished by a position-detecting circuit responsive to the back emf of the ECM to provide a simulated signal indicative of the rotational position of the motor's rotor to control the timed sequential application of voltage to the winding stages of the motor.

Referring back to FIG. 1, machine 11 comprises a basket 23 which is rotatable within a tub (not shown) which holds the water for washing the fabrics to be laundered, and a coaxially mounted agitator 25, both of which are rotatable independently or jointly about their common axis. Agitator 25 and basket 23 together comprise means for agitating water and fabrics to be laundered thereby to wash them and for thereafter spinning the fabrics to effect centrifugal displacement of water therefrom; however, it is contemplated that such means may also include only such basket, as provided in a typical tumbler laundry machine, for instance, within the scope of the invention so as to meet at least some of the objects thereof. Motor M is coupled selectively to the agitator alone during the wash cycle or mode and to both the basket and the agitator in the spin cycle through a connection mechanism 27 which may comprise a fixed ratio speed reducer, such as a gear box or a pulley arrangement for instance, or in some applications, it is believed that the shaft 17 of motor M could be directly coupled to the agitator and the basket. Mechanism 27 therefore comprises means for driving the agitating and spinning means. Power supplied from a 115 V 60 Hz AC line is rectified by a rectifier circuit 29 which defines a DC power source and applied to a power switching circuit 31 which constitutes means for controlling the application of the DC voltage to the winding stages to provide a resultant effective voltage thereto. Power switching circuit 31 responds to a set of control signals from a control signal circuit 33 for commutating the winding stages by applying the DC voltage thereto in at least one preselected sequence to cause rotation of the rotor 15. Control signal circuit 33 thus constitutes means operable for electronic commutation of at least one at a time of the winding stages of the electronically commutated motor M by applying a DC voltage thereto from the power source in the at least one preselected sequence to effect the energization of the electronically commutated motor and the rotation of the rotatable assembly. The motion of rotor 15 is selectively coupled as discussed above to at least one rotatable component of the laundry machine 11, namely basket 23, agitator 25 or both, to cause rotation of the rotatable component. The set of control signals of control signal circuit 33 are a function of rotor position—which is derived from a position sensing circuit 35—and selected conditions and parameters, such as applied voltage (as represented in part by an applied command signal).

Position sensing circuit 35 (see FIG. 4) includes a set of voltage dividers 51 for sensing the terminal voltages of the winding stages, which terminal voltages include a back emf and a field collapse voltage caused by commutation current and ending prior to appearance of the back emf. The particular output of the voltage dividers needed in any particular commutation period is the terminal voltage of the one winding stage which is not having DC voltage applied during that commutation period compared to neutral N. The terminal voltage of such unenergized winding stage is selected by a signal selector 53, which is responsive to the system's particular place in the commutation sequence at that time to supply the desired output of the voltage dividers to a position sensor circuit 55. The position sensor circuit 55 inventively and advantageously supplies a more accurate signal indicative of the angular position of the rotor, even under rapid rotor speed changes, to a commutation control circuit 57 whose outputs are the set of control signals B1, B3, B5, B7, B9, B11 to power switching circuit 31. Upon the rotor reaching a predetermined angular position, the commutation control circuit 57 (see FIG. 9 of said Erdman application) changes the control signals which are supplied to the power switching circuit 31 to commutate the winding stages. The commutation control circuit 57 also has an input from a non-commutation control circuit 59 which input represents a number of external commands such as an ON/OFF signal, a direction of rotation signal, and a slow/fast commutation signal.

Figure 9:
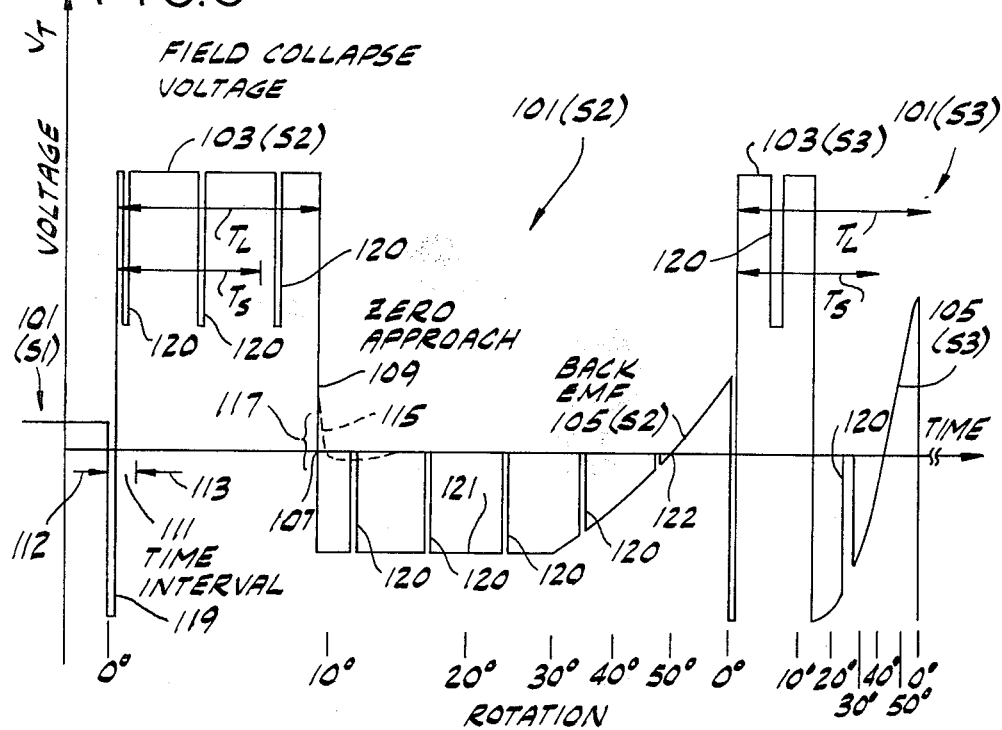
FIG. 9 is a graph of terminal voltage output versus time for illustrating zero approach detection and integration aspects methods of apparatus of the invention employed in FIGS. 5, 5A, 6, 6A and 7.

FIG. 9 illustrates a simplified view of the terminal voltages 101(S1) (just ending), 101(S2), and 101(S3) seen by the position sensor circuit 55 during successive commutation periods. The terminal voltages are derived from a different winding stage S1, S2 and S3 during each respective commutation period, indicated as repetitively extending from zero degrees through 60 degrees. Immediately following the commencement of a commutation at zero degrees (time 112) the voltage crosses zero while a winding stage S2 is being switched into a sense connection. Next follows an illustrated 10° interval when the portion 103(S2) of terminal voltage 101(S2) is of the same polarity as the anticipated back emf 105(S2) at the end of the commutation period. However, portion 103(S2) is not due to back emf. This field collapse voltage 103(S2) results from current which had been in the winding stage S2 while energized in the previous commutation period. While the field collapse voltage 103(S2) is illustrated as persisting for 10 degrees, the angular duration is actually highly motor and load dependent. The angular duration is also dependent on which transistors are pulse width modulated in power switching circuit 31, because of differences in the conditions that extract energy from the commutating current to produce field collapse voltage 103.

All this serves to suggest the difficulty in predicting the interval of time that a position integrator must be locked out to avoid sensing this commutating voltage or field collapse voltage 103 and forcing commutation to the next winding prematurely. Reset interval timers have been used successfully for locking the position integrator out for 20 electrical degrees based on the previous commutation interval. However, during periods of rapid speed change, reset interval timers can either produce reset times longer than 60 rotational degrees or less than the duration of the field collapse voltage 103. Either condition results in a loss of position, torque, and consequent high current in the switching transistors and flyback rectifiers.

For an illustration of the dilemma that arises in using a lockout period based on the previous commutation interval, consider long and short lockout periods $T_L$ and $T_S$ in FIG. 9. Terminal voltage 101(S3) is generated through 60° in a much shorter time than terminal voltage 101(S2) in the previous commutation interval due to acceleration of the rotor. Such acceleration occurs, for instance, in startup and reversal of the rotor.

If the long lockout period $T_L$ is selected on the basis of the duration of the field collapse voltage 103(S2), then the entire 60° of terminal voltage 101(S3) will be locked out. On the other hand, suppose some shorter lockout period $T_S$ is selected so that under acceleration at 101(S3), at least the positive part of the back emf 105(S3) is able to be integrated. Then such period $T_S$ will disadvantageously expose the integrator to field collapse voltage when deceleration occurs.

In solving this dilemma, a conceptual beginning is to provide a zero crossing detector to find the zero crossing at point 107 and then enable the integrator. However, the terminal voltage 101 is relatively complex and leads to the need for a more sophisticated approach. First of all, there is very little back emf 115 when the rotor is just beginning to turn at start up. In production, real circuits for detecting a zero crossing exhibit error variation in their ability to detect the zero crossing in emf curve 115. Also, production variations in the voltage dividers 51 of FIG. 4 introduce a zone of error 117 in the zero crossing because the neutral voltage $V_N$ is synthesized imperfectly and the terminal voltage 101 is a less-than-perfect replica of the actual winding stage voltage relative to actual neutral N. Because of the zone of error 117, a zero crossing detector may entirely fail to initiate the integrating of the back emf at the very low rotor speeds relative to which acceleration and deceleration are particularly important.

Accordingly, it is preferable to provide for detection of a voltage such as at zero approach 109 and not zero crossing 107. The detection of zero approach 109 as the field collapse voltage descends from peak to zero is then satisfactory for detecting the ending of the field collapse voltage whether the rotor is moving fast or very slowly.

The terminal voltage 101 can evidence zero voltage or zero approach occurences 120 caused by the use of pulse width modulation (PWM). When PWM is used in combination with a series inductance to limit inrush currents to the power switches, this voltage 120 can erroneously set the flip-flop FFA (described below in FIG. 6) for integration before the completion of the field collapse voltage, unless amplifier A1 and comparator 78 are slow enough to ignore this relatively rapid transient. Usually adequate inrush protection will be obtained with an inductor that will cause a transient of less than five microseconds duration, which will be ignored by most discrete component operational amplifiers and comparators.

Of longer duration, however, are zero approach voltages which are the consequence of selecting a power switch for PWM purposes that allows the voltage across the sense winding to collapse for the duration of PWM off period. If the power device that is turned off is of the same polarity as the device that had been driving the sensed winding prior to commutation, then the consequence of turning this device off is to allow the terminal voltages of all three windings to go to near the same potential as current is sustained in the one remaining on power device and the flyback diode of the alternate powered winding. If, however, the opposite polarity power device is selected for PWM, the voltage across the sensed winding will increase as the remaining on device will be of the opposite polarity to that at the terminal of the sensed winding. The first method of PWM device selection is referred to as slow commutation due to the reduced rate of energy extraction during PWM off, and the second described method is referred to as fast commutation due to the greater rate of energy extraction.

Figure 7:
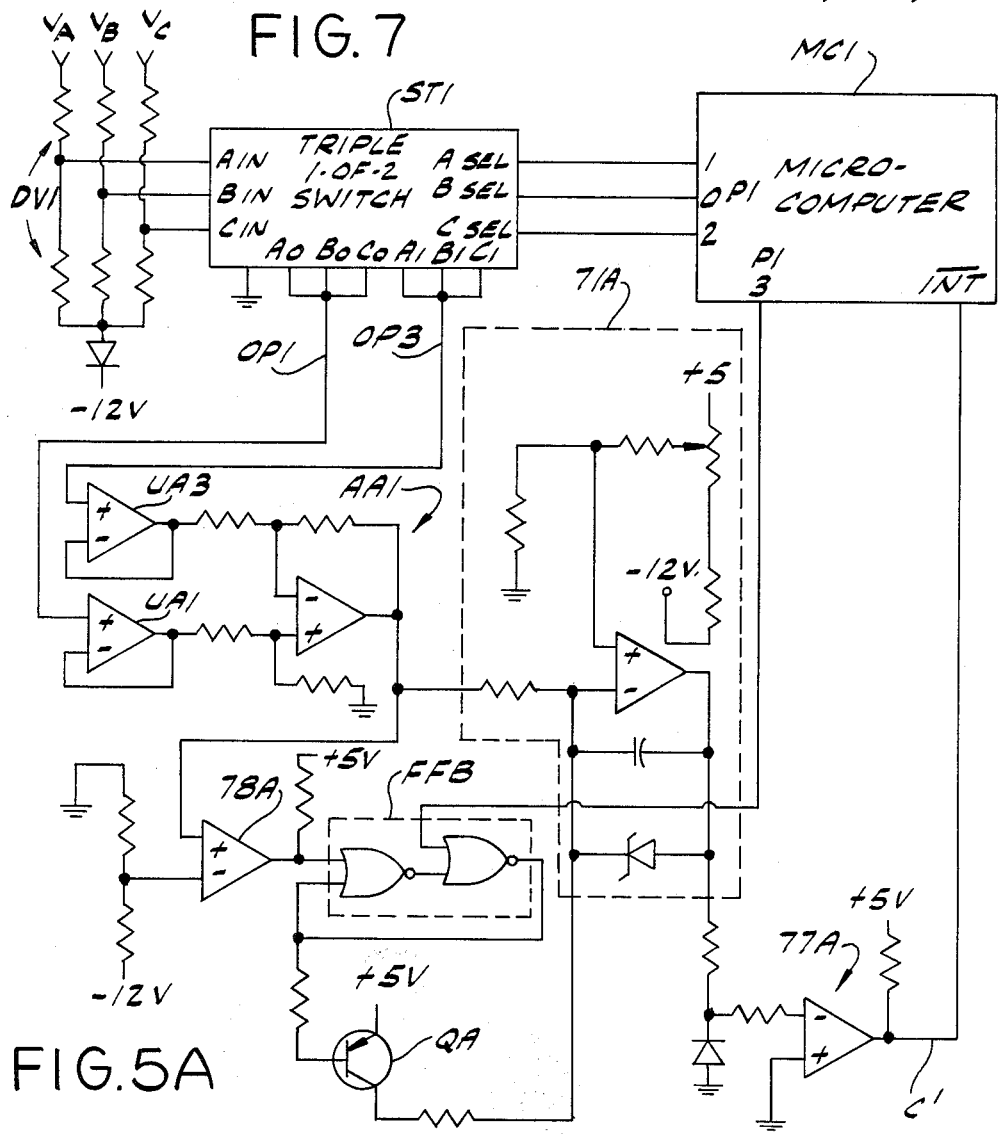
FIG. 7 is a schematic diagram of alternative position sensing the circuitry of the control system of this invention.
Figure 5A:
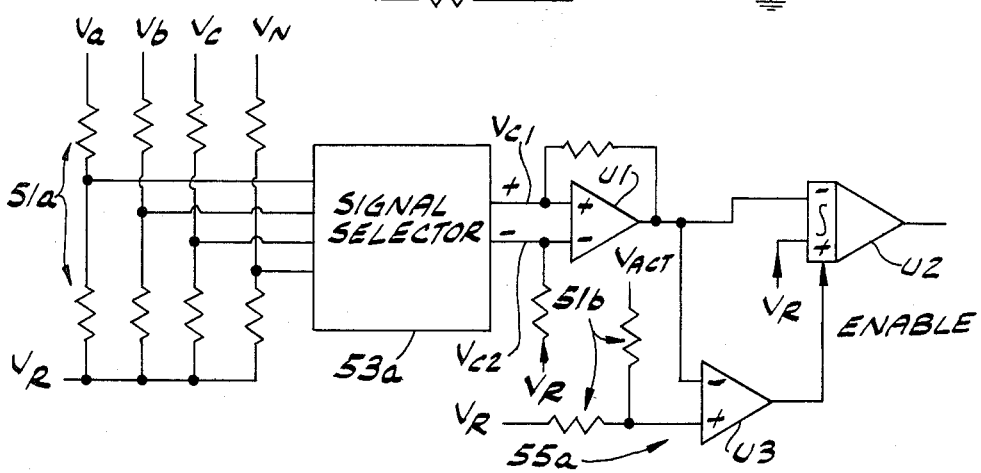
FIG 5A is a schematic diagram showing an alternative embodiment of the position sensing circuitry of the control system of this invention.
Figure 6:
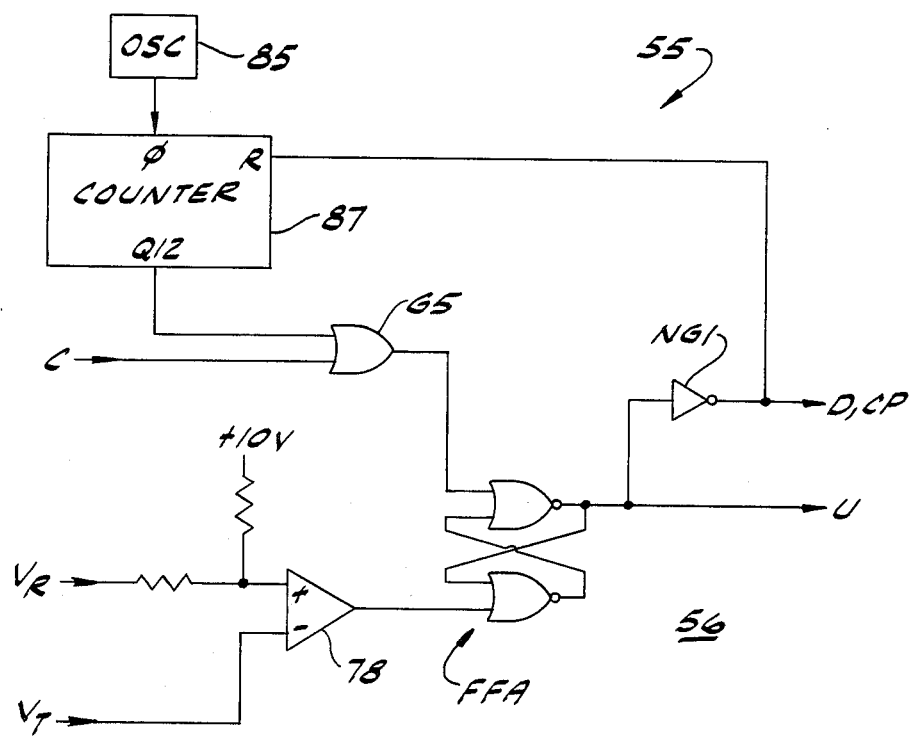
FIG. 6 is a schematic and waveform timing diagram of zero approach detection and integrator inhibit circuitry for the position ssensing circuit of FIG. 5 utilizing a method of this invention.
Figure 6A:
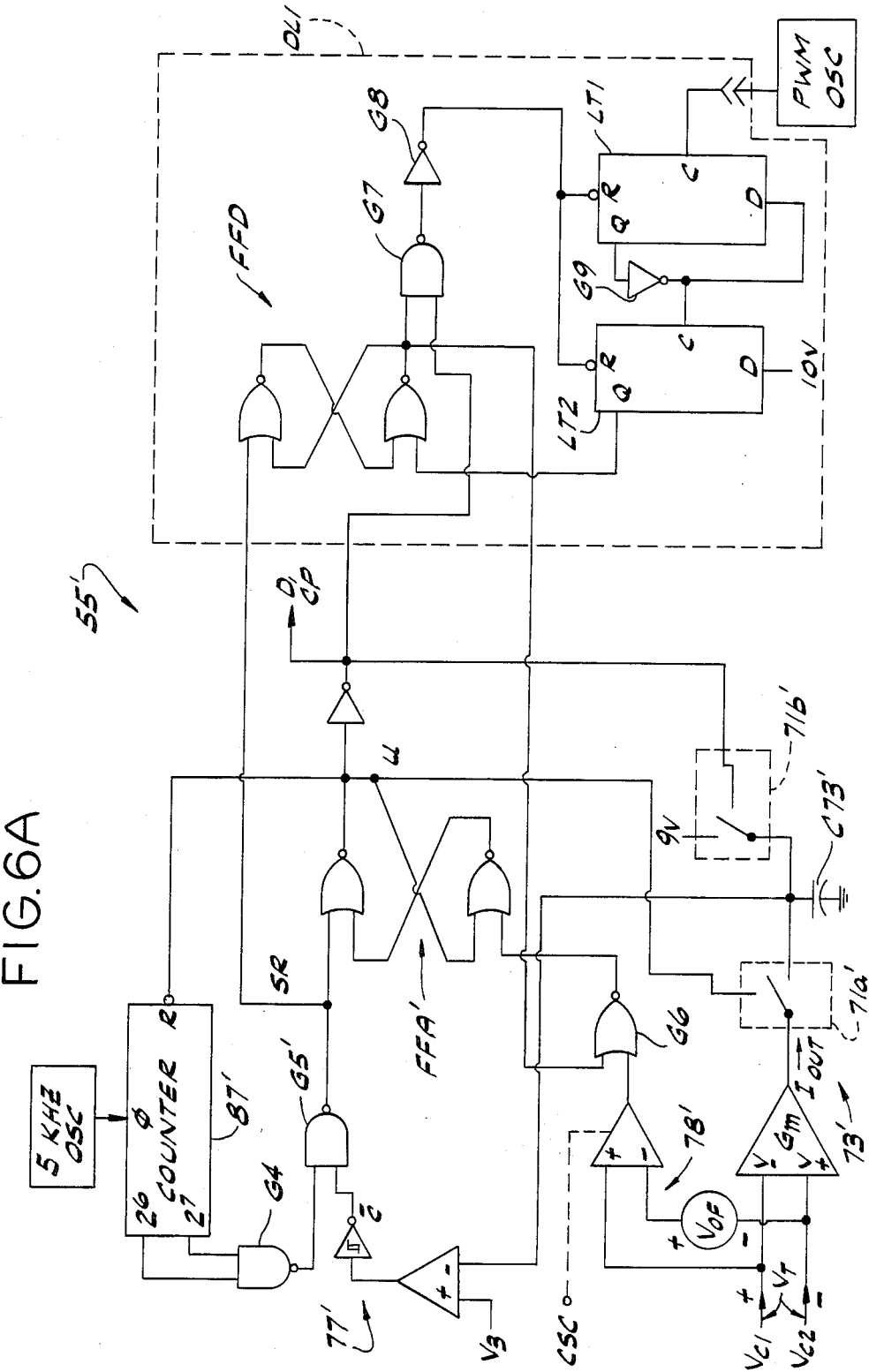
FIG. 6A is a schematic diagram of another embodiment of position sensing circuitry according to the invention.

Because of the zero approach that occurs during slow commutation, fast commutation is the preferred method of PWM control to be employed with the circuits of FIGS. 6, 6A and 7. FIG. 5A (to be discussed later) would be suitable for use with slow commutation. Albeit not shown for purposes of brevity, methods of voltage sampling keyed to the PWM on period may be utilized with the circuits of FIGS. 6, 6A and 7 to maintain proper function during slow commutation within the scope of the invention so as to meet at least some of the objects thereof; however, the benefits of slow commutation (no diverting of commutating current into the supply capacitor, and some reduction in audio noise) may not warrant the added complexity.

Another complication is that the terminal voltage 101 evidences an initial zero voltage or zero approach occurrence 119 reflecting switching in the signal selector 53. This zero crossing and zero approach condition occurs just after the commencement of commutation at point 112. Accordingly, in the preferred embodiment, the detection of zero crossings and zero approaches or integration resulting therefrom is inhibited for a predetermined time interval 111 beginning at or after the commencement of commutation 112 and expiring at point 113 before the ending of the field collapse voltage 103. The duration of predetermined time interval 111 is in general selected by the skilled worker so as to avoid any spurious detection of a zero approach or zero crossing. This interval 111 is so short compared to the duration $T_L$ of any field collapse voltage curve 103(S2), 103(S3) that acceleration and deceleration result in no dilemma.

Figure 4:
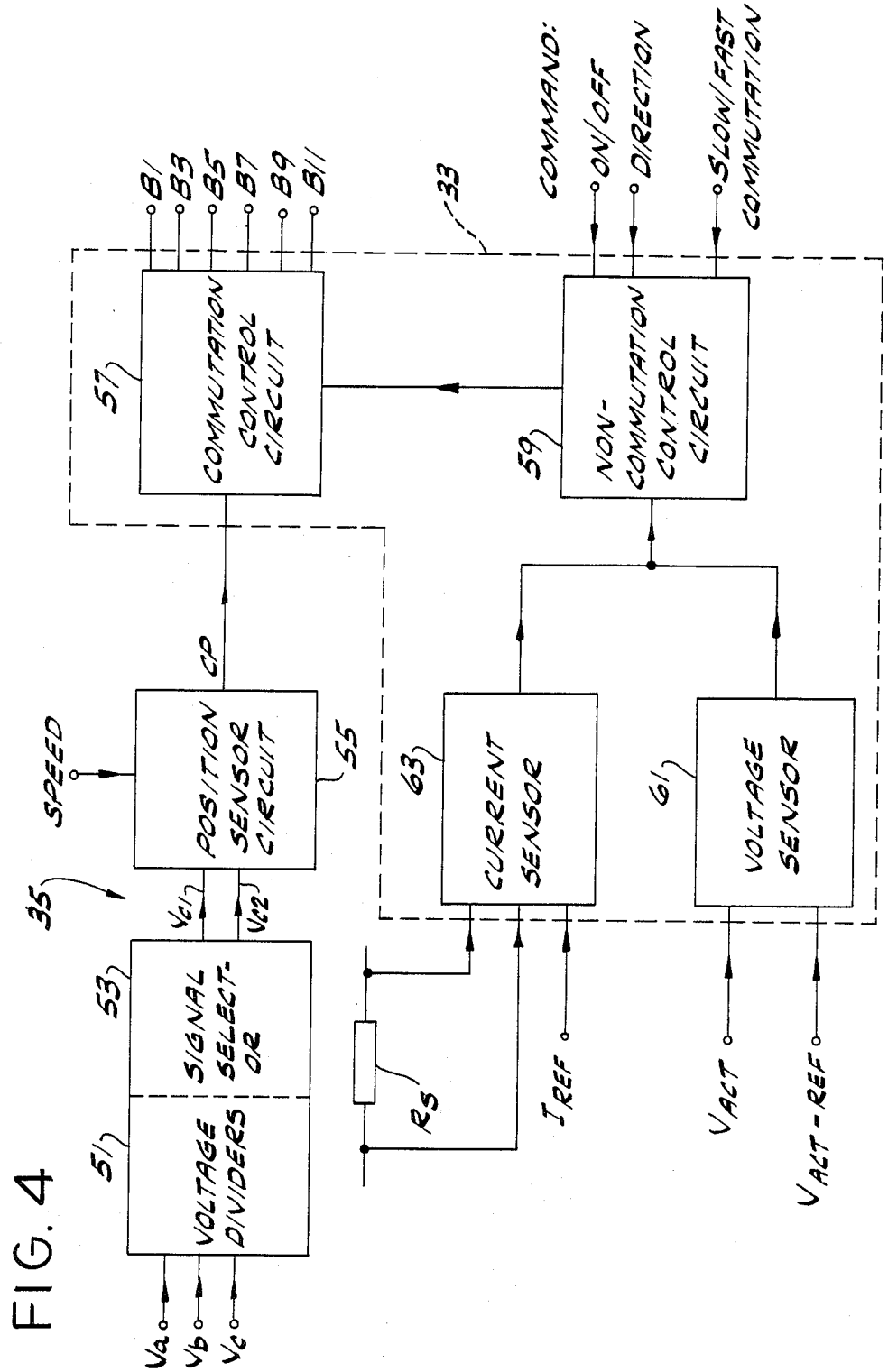
FIG. 4 is a block diagram showing in greater detail than FIG. 1 the major components of the control system of this invention.

In FIG. 4 the signal selector 53 has outputs $V_{C1}$ and $V_{C2}$ for providing the waveform illustrated in FIG. 9 to position sensor circuit 55. Position sensor circuit 55 is shown in greater detail in FIGS. 5 and 6. Outputs $V_{C1}$ and $V_{C2}$ are connected to the negative and positive input or receiving terminals respectively of a difference amplifier A1 (FIG. 5) having an offset which is correctable by means of a potentiometer R19. A 1.5 V reference voltage $V_R$ is also supplied via a 10 K resistor R21 by means of the diode drops of two forward biased diodes to the positive input of amplifier A1 to prevent out of range errors. Inasmuch as the voltage on one of outputs $V_{C1}$ or $V_{C2}$ is the actual or approximated neutral conductor voltage and the voltage on the other terminal is the terminal voltage of the stage not then being energized, difference amplifier A1 constitutes means for receiving and comparing the terminal voltage of at least one of the winding stages (namely the unenergized winding stage) with a reference (namely the neutral conductor voltage). It has been found that the output of amplifier A1 is a signal which can be used to determine the angular position of the rotor or rotatable assembly of the motor. Specifically, after the commutation currents die out, the output of amplifier A1 is a voltage 121 (FIG. 9) with an initial negative value proportional to speed, followed by a positive slope. The output $V_T$ of amplifier A1 is supplied through an electronically controlled switch 71 to an integrator 73 which constitutes means operable generally for integrating the output of amplifier A1 and which operates so as to ignore the output of difference amplifier A1 when the amplifier A1 output has a polarity opposite to the field collapse voltage. Switch 71 has three independently actuable switch units 71a, 71b and 71c, only the first two of which are connected to the output of difference amplifier A1, switch unit 71a being connected to said output through resistor R23 and unit 71b being so connected through resistor R25. Two switch units are used because it is desirable for integrator 73 to have two different time constants, one for each winding tap when a tapped motor winding is used. When the motor is operating in the High speed winding mode, i.e., when external command signal SPEED is a logic High, switch unit 71b is closed and the output of difference amplifier A1 is applied to the integrator through resistor R25, which resistor determines the integrator's time constant. When signal SPEED is a logic Low, switch unit 71a is closed instead, and the input to the integrator occurs through resistor R23, which provides a second time constant for the integrator. By this change in the integrator's time constant, a proper commutation angle can be maintained by compensating for the change in back emf per RPM that results from the use of a tapped motor winding. Clearly other means for compensation are available; such as altering the voltage threshold at the output of integrator 73 at which commutation is initiated. The SPEED command signal is applied to one input of an AND gate G1 and through an inverter 75 to one input of a second AND gate G3. The other inputs of gates G1 and G3 are connected to an internal command signal U, discussed below, which when High is the integrate signal. When command signal U is High, both logic gates are enabled. However, the output of only one goes High. Because of the presence of inverter 75, the other signals at the inputs to gates G1 and G3, labelled H and L respectively, cannot both be High at once. Hence only one can have a High output at any given time and so only one of switch units 71a or 71b can be closed at a given time.

The other switch unit of electronically controlled switch 71, namely unit 71c is controlled by an internal command signal D which is the complement of command signal U. When this switch unit is closed, which occurs from the beginning of commutation for at least a predetermined time of from approximately 50 to approximately 100 microseconds, the integrator is initialized by being reset to the limit voltage established by zener diode D17. Integration is also inhibited during this time because command signal U (the complement of signal D) is Low at this time. As a result the outputs of gates G1 and G3 are both Low, switch units 71a and 71b are both open, and integration is inhibited so that no portion of field collapse voltage 103 is mistakenly integrated by the integrator.

Integrator 73, as is explained below, only starts integrating, or being exposed to terminal voltage at least, after the terminal voltage of the winding stage being examined at least approaches zero at the ending of the field collapse voltage. Integrator 73 ignores the negative portion 119 (FIG. 9) in the back emf (the part opposite in polarity to field collapse voltage 103) by virtue of zener diode D17. When zero point 122 of FIG. 9 is reached, a physical reference rotor position in motor M is also reached and integration now develops values of voltage interpretable as rotor angle relative to the physical reference rotor position. Once integrator 73 starts integrating in this way, it integrates down from a voltage output of about 9 volts to a predetermined voltage level of about 3 volts, which latter output is indicative of an angular position (selected by the skilled worker) of the rotor when the commutation period should be terminated. The output is applied to a comparator 77 and when the output reaches 3 volts, the output of comparator 77, labelled C, goes High, which High is a commutation signal or pulse which represents the fact that the rotor is at the proper position for commutation of the winding stages. Thus, comparator 77 constitutes means responsive to a predetermined output level of integrator 73 for generating a commutation signal.

Figure 8:
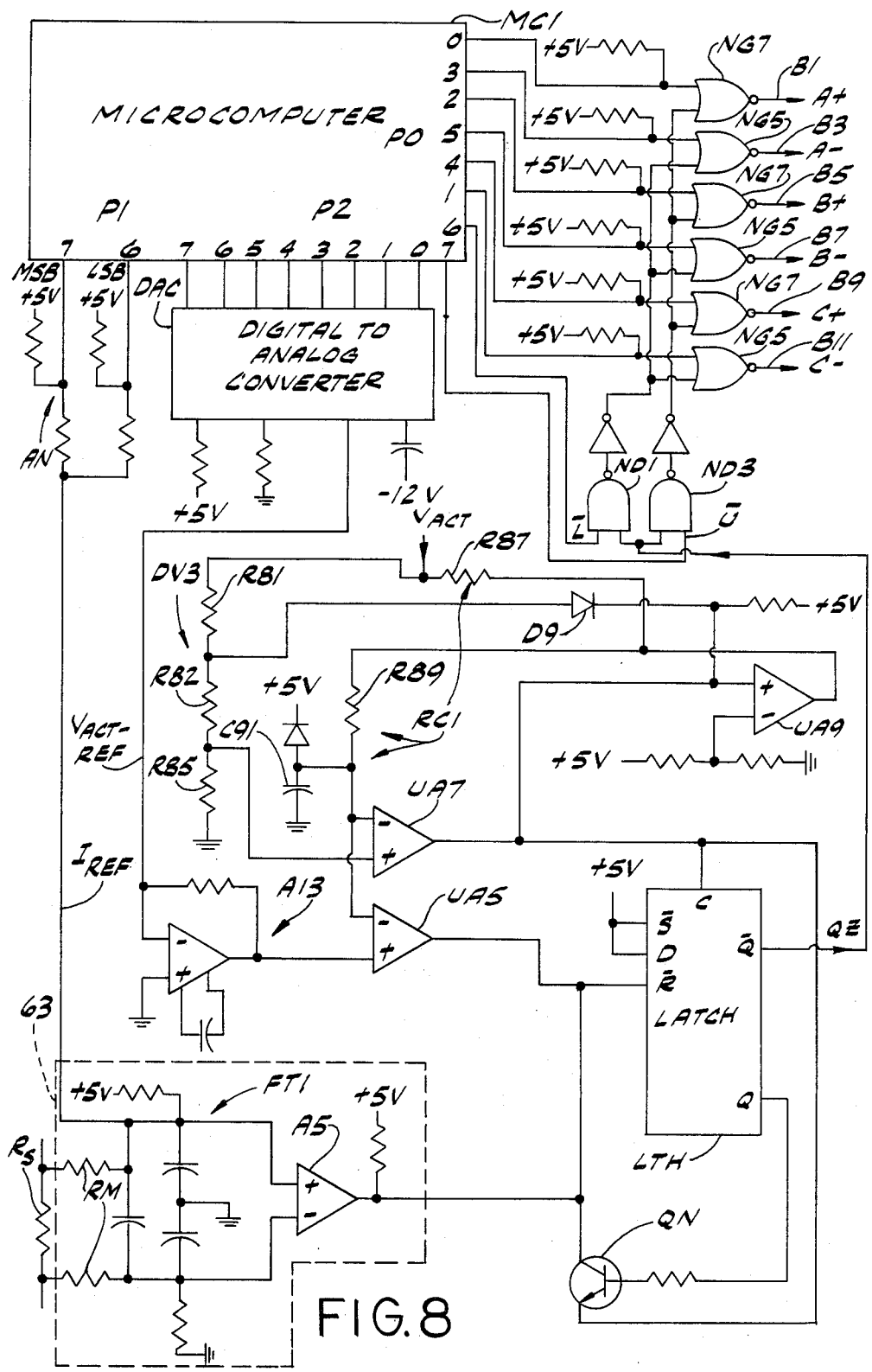
FIG. 8 is a schematic diagram of average voltage controlling circuitry of the present invention.

In FIG. 6 the output C of comparator 77 is supplied to OR gate G5 and flip-flop FFA which, together with comparator 78 and inverter NG1, constitute means responsive to the commutation signal for inhibiting the integrator for the predetermined length of time, initiating integration upon the first approach to zero at the ending of the field collapse signal and providing the commutation pulses CP to effect the operation of the commutation control circuit 57 to commutate the winding stages when the rotor reaches a predetermined angular position. Commutation signal C advantageously terminates the same commutation period as the commutation period during which the ending of field collapse voltage 103 occurred and initiated the operation of the integrator so as to result in the commutation signal in the first place. More specifically, the comparator 77 commutation signal C is applied to one input of an OR gate G5 (FIG. 6) driving a reset input of flip-flop FFA and providing control signal U directly and control signal D (also called CP) through inverter NG1. The circuitry of FIG. 6 differs principally from the circuitry of said Erdman application in that control signal D is generated differently. In FIG. 8 of the Erdman application a pair of divide-by-16 counters 83, 85 were used to keep command signal D High for approximately twenty electrical degrees. In the present work, command signal D stays High until the ending of the field collapse voltage in each commutation period.

Circuit 56 (which is the FIG. 6 portion of position sensor circuit 55) is seen to constitute means responsive to the commutation signal for effecting by signal CP the operation of the electronic commutation means and for inhibiting the operation of the integrator 73 for a predetermined length of time after a commencement of commutation of the at least some electronically commutated winding stages and before the ending of the field collapse voltage and for initiating the operation of the integrator when the terminal voltage of the at least one electronically commutated winding stage first approaches zero after the predetermined length of time and at the ending of the field collapse voltage.

Figure 5:
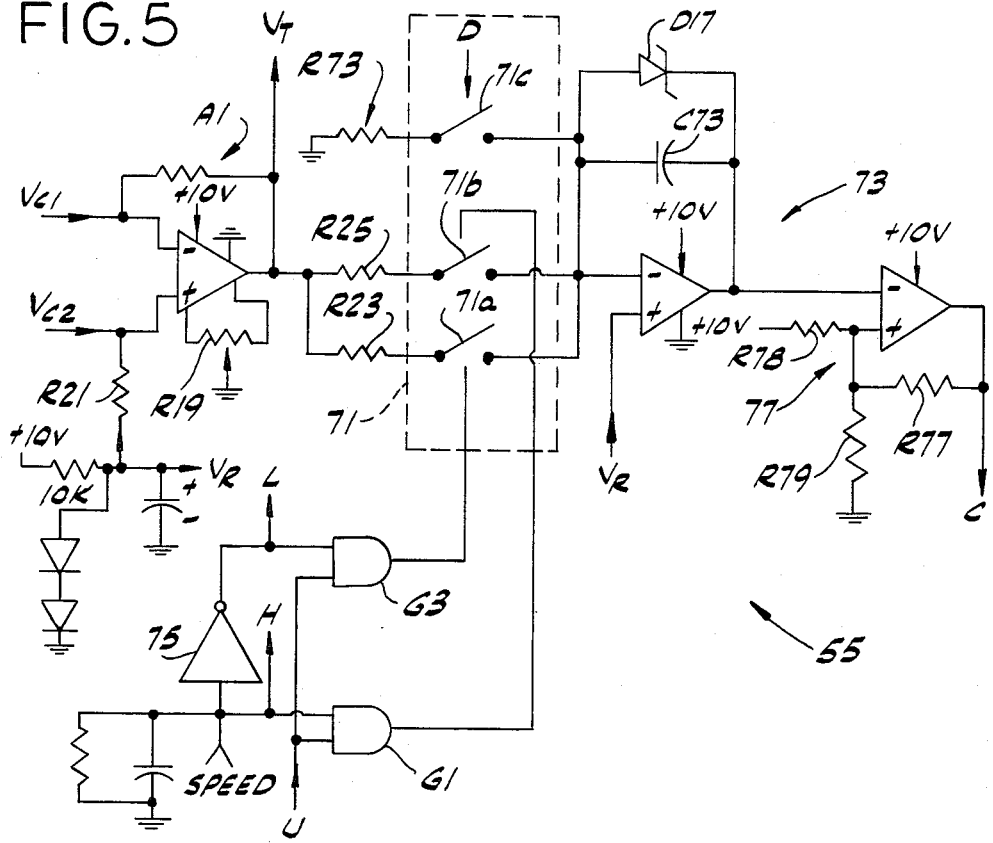
FIG. 5 is schematic diagram of part of the position sensing circuitry of the control system of this invention for use with the circuitry of FIG. 6.

In FIG. 5, integrator 73 and comparator 77 cooperate to provide the commutation signal, which is a pulse having a duration equal to the predetermined time period. When a commutate pulse C is produced, the leading edge thereof produces through flip-flop FFA signals D and U which in turn inhibit the integrator 73 through switch 71. Integrator 73 now sees its noninverting input at reference $V_R$ forcing its output to rise to High. However, the RC network R73, C73 requires time to charge. In the meantime, comparator 77 stays on until the hysteresis or positive feedback provided by 100 K resistor R77 is insufficient to keep comparator 77 from turning back off. The time factors result in commutation signal C being on for the 50 to 100 microsecond predetermined time period during which the integrator 73 is to be inhibited and reset.

"Inhibit" as the term is used herein denotes the action of flip-flop FFA keeping the integrator from being exposed to the terminal voltage $V_T$, in such manner that even if a zero crossing be detected, the integrator is not enabled. The integrator is inhibited by flip-flop FFA during the predetermined time period by action of commutation signal C, because even if comparator 78 goes high during signal C, flip-flop FFA prevents the integrator from responding. If a zero approach is not detected by comparator 78 for a while after the predetermined time period expires, the integrator 73 is prevented from operation until the ending of the field collapse signal but not inhibited because the first approach to zero will enable it by action of comparator 78 setting flip-flop FFA and exposing integrator 73 to terminal voltage $V_T$ through switch 71.

Output C is connected (FIG. 6) through OR gate G5 to the reset input of a NOR gate flip-flop FFA. The set input of flip-flop FFA is connected to the output of comparator 78 which is configured as a zero-approaching detector and constitutes means for initiating the operation of integrator 73 when the terminal voltage of the at least one electronically commutated winding stage first approaches zero after commutation, and specifically after the predetermined length of time after commutation and at the ending of the field collapse voltage. More specifically, the inverting input of comparator 78 is connected to the output of amplifier A1, which output is the terminal voltage signal $V_T$ from the unenergized winding. When the field collapse voltage of the unenergized winding crosses or closely approaches zero, the output of comparator 78 goes High. The approach reference level is set at about 100 millivolts above the offset reference $V_R$, for example, by choice of resistors at the noninverting input of comparator 78. Thus, the zero approach reference is at least approximately one percent of the ten volt peak value of the terminal voltage produced as voltage $V_T$.

Zero crossings or approaches occurring during the predetermined 50 to 100 microseconds length of time after commencement of commutation do not cause a change in the output of flip-flop FFA because the reset input of the flip-flop is held High by commutation signal C. The predetermined length of time is selected to allow any voltage behavior 119 (FIG. 9) to end and the integrator to reset before flip-flop FFA can be set by zero-crossing or zero approaching detector 78. Then commutation signal C goes Low and stays Low until the next commutation. Because of the presence of field collapse voltage 103, the output of zero-crossing or approaching detector 78 is Low by this time and stays Low until the voltage 103 crosses or closely approaches zero, which indicates that the commutation currents have dissipated and the ending of the field collapse voltage has occurred. At that time flip-flop FFA is set and its output as signal U goes High. The High output of the flip-flop is inverted by inverter NG1 and the resulting Low output is supplied as the trailing edge of command signal D and commutation pulse CP of FIG. 4. Signal U initiates and enables integrator 73 by closing the appropriate one of electronically controlled switches 71a and 71b, and signal D being Low opens switch 71c.

Note that during the predetermined length of time after commutation, signal C is High, so the output of flip-flop FFA is Low. This inhibits AND gates G1 and G3 and keeps switches 71a and 71b open for the duration of the predetermined length of time after commencement of commutation. Furthermore, signal D keeps switch 71c closed, resetting integrator 73. Signal C additionally keeps flip-flop FFA reset during the predetermined length of time after commutation, so that zero crossings during the predetermined length of time are ignored by integrator 73.

The selection of component values for this network will include numerous considerations well known to those skilled in the art. A set of component values consistent with the objectives of this circuit are:

C73 = 0.001 microfarad
D17 = 8.2 volts
R23 = 33 K ohms
R25 = 15 K ohms
R73 = 10 K ohms
R77 = 100 K ohms
R78 = 220 K ohms
R79 = 560 K ohms 50 KHz Oscillator 85 and resettable divide by 4096 counter 87 act as a motor starting circuit for the system by providing a start pulse about every 80 milliseconds. The requirement for this start pulse only occurs when the random alignment of the permanent magnet rotor 15 is such that no torque is developed. The start pulse then forces commutation to the next drive state which will develop torque and consequent rotor movement. When the rotor begins to turn, commutate pulses C produce the D output which resets the counter 87 more frequently than the 80 milliseconds, thereby avoiding any undesired pulses from counter 87 after starting.

An alternative approach to that illustrated in FIGS. and 6 is shown in FIG. 5A, and while the circuit of FIG. 5A meets at least some of the objects set out hereinbefore, it is believed that such circuit may have indigenous objects and advantageous features as will be in part apparent and in part pointed out hereinafter. Rather than wait for the terminal voltage of the unenergized winding to approach zero, the circuit of FIG. 5A enables the integrator once the terminal voltage falls below the rail or supply voltage. In normal, loaded motoring conditions, the terminal voltage of the unenergized winding is clamped to the positive or negative supply voltage $V_{ACT}$ during the collapse of the field in that winding after commutation. Thus the terminal voltage is the higher magnitude field collapse voltage portion beginning with commencement of commutation and ending prior to appearance of the lower magnitude back emf portion. Once this field collapses, the terminal voltage of the unenergized winding is simply the back emf portion of that winding which is normally significantly below the supply voltage in magnitude. Specifically, the circuit of FIG. 5A includes a voltage divider 51a connected between the terminals of the winding stages and the reference voltage $V_R$. The proper terminal voltage (i.e., the one corresponding to the unenergized winding) is selected by circuit 53a as described above and supplied to an amplifier U1. The output of amplifier U1 is supplied not only to a position determining integrator U2 but also to the inverting input of an operational amplifier U3. The other input of amplifier U3 is set at a reference voltage derived from the supply voltage $V_{ACT}$ by a voltage divider 51b. While the terminal voltage of the unenergized winding stays near the supply voltage, the output of amplifier U3 inhibits and resets the integrator U2. But when the terminal voltage falls below the reference, amplifier U3 enables integrator U2 and integration of the back emf proceeds as described above. Thus, it can be seen that amplifier U3 constitutes means for inhibiting the operation of the integrating means until the terminal voltage of one of the at least some electronically commutated winding stages falls in magnitude below a preselected level selected to exceed that of the back emf of a winding stage under motoring conditions. Further, the consequence of slow commutation is minimal, as during the PWM off period little integration will take place due to the low voltage that will occur, and subsequently the integrator will be reset when the PWM returns to the on period.

In FIG. 6A, alternative position sensing circuitry 55' has some numerals primed to suggest circuit portions performing functions corresponding to those in FIGS. 5 and 6. The circuit 55' is contemplated for implementation on a single integrated circuit chip. While the circuit of FIG. 6A meets at least some of the objects set out hereinbefore, it is believed that such circuit may have indigenous objects and advantageous features as will be in part apparent and in part pointed out hereinafter.

Integrator 73' utilizes a transconductance amplifier providing current $I_{out}$ proportioned to the terminal voltage difference $V_T$ appearing between voltages $V_{C1}$ and $V_{C2}$. The current $I_{out}$ is provided to the capacitor C73', which integrates from the supply voltage down to a predetermined voltage $V_3$. Then circuit 77' operates to generate a commutation signal, with the comparator therein driving an inverter with hysteresis.

Flipflop FFA' provides the U and D pulses and is set by zero-approach detector comparator 78' and reset by commutation signal generating circuit 77'. An inhibit High signal is provided to NOR-gate G6 by delay circuit DL1 in response to the commutation signal C-bar. The inhibiting High isolates zero approach detector 78' from flipflop FFA' and integrator 73'. Signals U and D control analog switches 71a' and 71b' to disconnect capacitor C73' from the transconductance amplifier and connect it to the positive supply rail or vice versa. Thus signals U and D reset and enable the integrator 73'.

Zero approach detector 78' is a differential mode comparator with fixed internal offset voltage $V_{OF}$ at which the zero approach 109 is detected. The voltage $V_{OF}$ is provided in a CMOS (complementary metal oxide semiconductor) chip as by an intentional current injected to develop a voltage drop equal to $V_{OF}$. Inhibit gate G6 keeps zero approach detector 78' from setting flipflop FFA' during the nominally 50 to 100 microsecond time period set by circuit DL1.

Circuit DL1 develops the minimum reset time through RS flipflop FFD, gates G7, G8, G9 and the two "D" flipflops LT1 and LT2 fed by a nominal 10 KHz. PWM oscillator for the motor. The initial pulse SR arrives as a logic one resetting flipflop FFA'. Pulse SR appears at NAND-gate G5' in response to commutation signal generating circuit 77' or the motor-start counter circuit including a 5KHz. oscillator, counter 87' and NAND-gate G4. In circuit DL1, signal D has been low, which has kept latches LT1 and LT2 reset through gates G7 and G8. Pulse SR sets flipflop FFD High. Signal D rapidly goes High at flipflop FFA' in response to pulse SR being High, thereby removing the forced reset input from latches LT1 and LT2. Neither of these devices will change state, however, until a positive going signal is applied to the respective C clock input of LT1 or LT2. The first positive-going edge from the PWM oscillator drives latch LT1 output Q High. Inverter G9 takes the clock input to latch LT2 Low. The second positive going edge from the PWM oscillator drives latch LT1 Low. Inverter G9 takes the clock input to latch LT2 High. The High-going clock input to latch LT2 drives its output Q high, which in turn resets flipflop FFD. Flipflop FFD thereby removes the High input to NOR-gate G6 which had been ultimately inhibiting integrator 73' through flipflop FFA', and the inhibit ceases after the predetermined length of time 111.

Optional zero approach comparator speed compensation CSC is providable by means of an external capacitor or voltage. Compensation CSC provides for slow down of the very fast operation achievable by the comparator in circuit 78' when implemented on an integrated circuit chip. If very fast noise pulses come into the circuit 55', too fast a response as during time period 111 or at other times could defeat the function of the circuit. The circuit DL1 operates to inhibit false detections of zero crossings during the time period 111. It is contemplated, however, that circuit DL1 can be omitted when compensation CSC is provided so that the detector circuit 78' is slow enough to only detect zero approaches that last in excess of the predetermined time interval of 50 to 100 microseconds.

Another alternative embodiment of the circuit of FIG. 5 is shown in FIG. 7, and while the circuit of FIG. 7 meets at least some of the objects set out hereinbefore, it is believed that such circuit may have indigenous objects and advantageous features as will be in part apparent and in part pointed out hereinafter. See Alley U.S. Pat. No. 4,250,544 for disclosure of programming of microcomputer circuitry to obtain terminal voltage and provide currents in a preselected sequence to the electronically controlled motor, and for other purposes. The FIG. 7 embodiment includes a logic circuit under programmed control, namely a microcomputer MC1 for, inter alia, receiving the commutation signal C' and for supplying an integrator inhibit signal on port P1 line 3. The inhibit signal on P1 line 3 is supplied for the predetermined 50 to 100 microseconds length of time after receipt of the commutation signal C' by programming the microcomputer with an interrupt routine using a technique familiar to the skilled worker so as to accomplish the production of the inhibit signal in the manner of a one-shot. For instance, as soon as the interrupt routine is commenced in response to commutation signal C', the program sets P1 line 3 high and then tests a timer so that when the predetermined time interval has been exceeded, the line is set low.

Microcomputer MC1 has three P1 outputs 1, 0 and 2 connected to the A, B and C select pins of a 4053-type triple 1-of-2 switch ST1. The three inputs of switch ST1 are connected to a voltage divider DV1 in such a manner that one input represents the terminal voltage VA of one winding stage of the electronically commutated motor, a second input represents the terminal voltage VB of a second motor winding stage, and the third input represents the terminal voltage VC of the third winding stage. Switch ST1 has two outputs OP1 and OP3. The microcomputer MC1 is programmed to control switch ST1 during each commutation period so that the signal on one of the two outputs is proportional to the terminal voltage of the unenergized winding by switching from the leg of divider DV1 connected to that winding, e.g., $A_{in}$ to OP3. The signal on the other output is an approximated neutral conductor voltage obtained by programming microcomputer MC1 to switch both of the other two inputs, e.g., $B_{in}$ and $C_{in}$ to output OP1. The signals are assigned to OP1 and OP3 so that the voltage difference between them is as shown in FIG. 9, for successive commutation periods.

The signals on outputs OP1 and OP3 are supplied through a pair of unity gain amplifiers UA1 and UA3 which constitute means for providing a high impedance to outputs OP1 and OP3 of switch ST1 and a low impedance to the inputs of an amplifier AA1. Amplifier AA1 is analogous to amplifier A1 of FIG. 5 in that its output represents the terminal voltage (inverted in polarity so that field collapse voltage output is negative) of the unenergized winding stage. The output of amplifier AA1 is supplied to an integrator 71A similar to the integrator 71 of FIG. 5 except that integrator 71A integrates in the direction of more positive magnitudes and has an adjustable reference at the noninverting input. The adjustable reference provides compensation for manufacturing variations in divider DV1 and other components. In this way integration error at slow rotor speeds is adjustably minimized. The output of amplifier AA1 also feeds a zero crossing or approaching detector 78A. Because the amplifier AA1 field collapse voltage is negative, a negative voltage divider reference is provided at the inverting input of detector 78A. The output of the zero crossing or approaching detector 78A is connected to the set input of a NOR gate flip-flop FFB, whose reset input is connected to the P1,3 output of microcomputer MC1. The reference voltage for detector 78A is preferably set to be at least one percent of the peak value of the field collapse voltage provided to detector 78A.

The output of integrator 71A, which is the integrated back emf of the unenergized winding, is supplied to a comparator 77A having its comparator input diode-protected. When the integration increases to and reaches a positive preset value representative of the desired rotor position for commutation, the output of comparator 77A goes Low, which is a commutation signal C', analogous to but opposite in polarity from', commutation signal C of FIG. 5. The output of comparator 77A is connected to an interrupt pin P3,2 INT-bar (low active) of the microcomputer MC1. When the output of the comparator 77A goes Low, which signifies the beginning of commutation, the microcomputer is directed by its program to supply a High signal on line P1,3 to the set input of flip-flop FFB for the predetermined length of time, which again is from approximately 50 microseconds to approximately 100 microseconds. During this time the output of flip-flop FFB is held Low by the High on pin P1,3. This Low turns on a PNP transistor QA, which resets integrator 71A during the predetermined length of time to prevent unintended integration of field collapse voltage of the unenergized winding. Transistor QA thus constitutes means to prevent or inhibit integration during the predetermined length of time after receipt of the commutation signal. After the predetermined length of time has passed, the microcomputer causes pin P1,3 to go back Low, thereby removing the inhibition signal from the flip-flop FFB and the integrator 71A. The first subsequent zero crossing or approach (which occurs at the end of the field collapse voltage) causes the output of comparator 78A to go High, causes flip-flop FFB to be set high, transistor QA to be turned off, and integrator 71A to be thereby enabled.

Upon receipt of the commutation signal C', microcomputer MC1 is also programmed to supply at port PO, pins 0-5, the necessary control signals B1, B3, B5, B7, B9 and B11 (see FIG. 8) to commutate the proper winding stages to cause rotation of the rotor.

In FIG. 8, microcomputer MC1 is again shown, this time with emphasis on an additional set of outputs, as for an Intel 8051 unit. The microcomputer MC1 is programmed to use these outputs to control the peak motor current and the average pulse width modulated (PWM) voltage applied to the winding stages, as well as for commutating the winding stages. The actual available power supply voltage applied at any given time to the winding stages is labelled $V_{ACT}$ and is an input to the circuitry of FIG. 8, as is the voltage across motor current sensing shunt resistor $R_s$ (see also FIG. 4).

The microcomputer MC1 supplies a two bit signal at port 1 representing the maximum desired peak motor current $I_{REF}$ on pins 6 and 7 (pin 7 representing the most significant bit MSB) through an adder network AN of resistors to the non-inverting input of an op-amp A5. The voltage across shunt resistor $R_s$ is applied through a pair of matched resistors RM and a filter FT1 across the inputs of op-amp A5, so the output of amplifier A5 represents whether or not the actual peak motor current exceeds the reference peak motor current $I_{REF}$ set by the signals on pins 6 and 7 of the microcomputer. Amplifier A5 thus constitutes means for comparing the peak motor current with the microcomputer-set current reference. During operation, if different motor current levels are desired at different points in the operation of the motor, the motor current can be changed directly by the microcomputer at the desired time by changing the signals on P1 pins 6 and 7. Of course, if finer gradations of motor current are desired than are available with only two bits, additional output pins of the microcomputer could be used to output a desired motor current word consisting of more bits. In such a case, the use of a digital-to-analog converter to convert the microcomputer output to analog form could be desirable.

When the actual motor current exceeds the microcomputer's reference motor current, the output of amplifier A5 goes Low. This Low is supplied to the low active reset-bar input of a D-type latch LTH, which causes the Q-bar output labelled QZ to go High. Output QZ is supplied to a pair of NAND gates ND1 and ND3 whose other inputs are signals from port PO pins 6 and 7 respectively of the microcomputer. PO Pins 6 and 7 determine which set of transistors (either the upper (U-bar) or the lower (L-bar)) in power switching circuit 31 are to be left on when power is cut off, to allow current in the windings to circulate, as is explained in the aforementioned David M. Erdman application Ser. No. 463,147. The signals on PO pins 6 and 7 are complementary, so when output QZ goes High, it causes the output of one of gates ND1 and ND3 to go High and the other to stay Low. The output of gate ND1 is connected through an inverter to a set of three NOR gates NG5 whose outputs are the lower transistor control signals B3, B7 and B11 corresponding to winding stage connections A−, B− and C−. Likewise the output of gate ND3 is connected through an inverter to a set of three NOR gates NG7 whose outputs are the upper transistor control signals B1, B5 and B9 corresponding to winding stage connections A+, B+ and C+. When the output of gate ND1 goes Low because output QZ is High and PO pin 6 is High, gates NG5 are disabled. This breaks the circuit from $V_{ACT}$ through the energized windings to ground and thereby reduces motor current. Likewise, when the output of gate ND3 goes Low because output QZ is High and PO pin 7 is High, gates NG7 are disabled, which again breaks the circuit but at a different point therein. In either case, the excess motor current signal from amplifier A5 causes the external application of voltage to the windings to cease. Application of voltage to the windings is resumed when the PWM oscillator at UA7 clocks the latch LTH back on.

Microcomputer MC1 also controls the average voltage applied to the windings over a nominally 10 to 20 KHz. PWM cycle, by supplying an 8-bit word representing a reference voltage over P2 pins 7-0 to a digital-to-analog converter DAC. As in the case of the peak current reference, the average voltage reference may be changed from cycle to cycle, or conceivably even within a cycle, as required to obtain the desired operating characteristics of motor M. The analog output $V_{ACT-REF}$ of converter DAC is supplied through an amplifier A13 configured as an inverter to the non-inverting input of a comparator UA5 which compares the $V_{ACT-REF}$ reference voltage set by the microcomputer with a function of the actual DC power supply voltage $V_{ACT}$ being supplied to the motor windings. Specifically, the reference voltage $V_{ACT-REF}$ is compared by amplifier UA5 with the integral of the actual applied voltage as approximated by a resistor-capacitor circuit R87,R89,C91 generally designated RC1 which constitutes means for generating a direct function of the applied voltage. When the voltage on the capacitor of circuit RC1 reaches the reference voltage, the output of amplifier UA5 goes Low. Thus, amplifier UA5 constitutes means for comparing the function of the applied voltage to a reference and for indicating when the function reaches the reference. Since the output of amplifier UA5 is connected to the reset-bar input of latch LTH, the Q-bar output of the latch goes High when the integral of the voltage reaches the voltage reference, which stops the application of external power to the winding stages as explained above in connection with motor current control.

Note that when the integral of the applied voltage reaches the reference the voltage on the capacitor of circuit RC1 is not reset (e.g., made to be zero). Rather the integration is allowed to continue even though the external application of power has ceased. In other words, the cycle for power being applied to the windings is not stopped because the integral reaches the reference value. Rather, the cycle length is controlled by a voltage divider DV3 and a second comparator UA7. The inverting input of comparator UA7 is, like that of comparator UA5, connected to the integral approximating circuit RC1. The non-inverting input, however, is connected to voltage divider DV3.

Divider DV3, circuit RC1, and comparators UA7 and UA9 amount to a sawtooth oscillator circuit. Comparator UA7 signals when capacitor C91 should start charging and subsequently stop charging. Variations in the cycle length of the sawtooth oscillations which might occur in response to variations in the DC supply voltage $V_{ACT}$ are minimized or eliminated by applying $V_{ACT}$ both to divider DV3 and to charging circuit RC1. Potential cycle shortening which might occur due to a rise in $V_{ACT}$ causing capacitor C91 to charge to a given voltage in a shorter time is compensated by divider DV3 presenting a higher voltage to which C91 must charge before comparator UA7 changes state. The values of the resistors R81,R82,R85 in divider DV3 and components R87,R89 and C91 of circuit RC1 are selected so as to set the cycle length for the application of voltage to the windings at a predetermined value. Examples of component values are: R81—1.37 megohm, 1%; R83—13 K, 1%; R85—13 K, 1%; R87—5.5 megohm, 5 %; R89—1.8 K, C91—0.001 microfarad. The actual applied voltage $V_{ACT}$ is supplied to the top of divider DV3 and the predetermined fraction thereof is supplied to the noninverting input of comparator UA7.

When the function of the applied voltage represented by the voltage on the capacitor C91 of circuit RC1 reaches the predetermined fraction of the applied voltage, the output of comparator UA7 goes Low. Thus, comparator UA7 constitutes means for signaling the end of each voltage cycle when the function of the applied voltage reaches the predetermined value. UA7 going low causes transistor QN to momentarily drive reset-bar of latch LTH low until output Q of LTH responds by going low. Transistor QN thus acts as an electronically controlled switch for connecting the output of comparator UA7 to the input of latch LTH, the base of transistor QN being connected to the Q output of the latch. Q-bar output goes High which, as above, results in the cessation of the application of external power to the winding stages if this has not already occurred. Latch LTH thus constitutes means for terminating the external application of voltage to the load when the function of the applied voltage reaches the reference and for terminating the present cycle.

The output of comparator UA7 is also connected to the non-inverting input of comparator UA9, whose other input is held at approximately 2.5 V. When the output of comparator UA7 goes Low, diode D9 pulls down the DV3 divider voltage and the output of comparator UA9 goes Low as well, controllably discharging the capacitor C91 of circuit RC1 through R89. When the capacitor is discharged the output of comparator UA7 goes High again because a DV3 voltage equal to about half the diode D9 diode drop is fed to the noninverting input of UA7. When comparator UA7 goes High, divider DV3 is restored since diode D9 becomes reversed biased. Also at this time comparator UA9 goes high so that $V_{ACT}$ resumes charging the capacitor C91, and a new cycle is begun. UA7 going high clocks LTH Q-bar output low which restores the application of external power to the winding stages. Comparator UA9, because it controllably discharges the capacitor, thus ensures that the minimum off period at the end of each cycle is of sufficient length to allow the op-amp A5 to clear of a sensed peak current condition before a new cycle begins. Failure to provide this feature results in a discontinuity of motor control as increasing current load first approaches the peak current regulate point.

From the above, it can be seen that the same circuit, namely circuit RC1, provides the integral of the applied voltage for comparison with the $V_{ACT-REF}$ voltage reference, and the timing for terminating each cycle.

Such an arrangement permits the use of low precision (e.g., ±10%) capacitors for C91 because the error in the capacitance of that capacitor of circuit RC1 cancels out from the calculation of the average voltage applied in a cycle to the winding stages. If separate resistor-capacitor circuits were used to calculate the integral and to determine the cycle length, the error in average voltage (which is their ratio) caused by the use of low precision capacitors in each circuit could be significant. However, with the present arrangement, the error in the integral value and the error in the cycle length caused by manufacturing variations in the capacitance of the capacitor of circuit RC1 in effect cancel out, resulting in much better accuracy.

Figure 10:
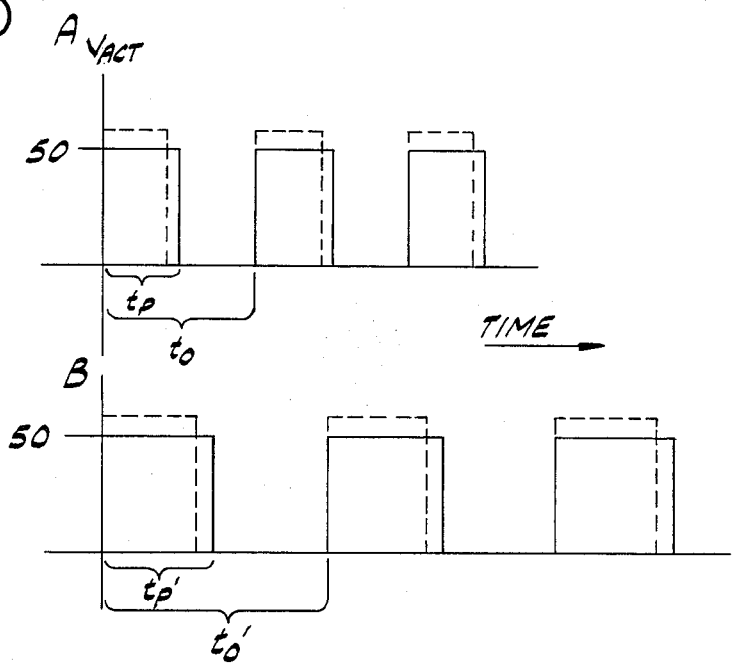
FIG. 10 is two graphs of width modulated pulses for illustrating average voltage control aspects of methods and apparatus employed in FIG. 8.

FIG. 10 graphs A and B each show voltage-versus-time illustrations of pulse width modulated cycles for Motor M corresponding in timing to FIG. 8 latch output Q, the complement of QZ. It is noted in passing that the time axis of FIG. 10 is much magnified because the cycle length of the PWM cycles of FIG. 10 is the same as the interval between cycles showing in the voltage behavior 120 of FIG. 9. Graph A shows successful average voltage control utilizing a first value of capacitance of capacitor C91. Graph B corresponds to equally successful average voltage control with a larger value of capacitance of capacitor C91 than in graph A.

Suppose, for example, that an average 25 volts $V_{ACT-REF}$ is ordered by microcomputer MC1, and that a presently occurring level of $V_{ACT}$ is 50 volts. Then, as shown in graph A of FIG. 10, the 50 volt pulses (solid lines) have cycle length $t_o$ and a pulse length $t_p$ during which $V_{ACT}$ is applied to the load. The FIG. 8 circuit sets pulse length $t_p$ half as long as cycle length $t_o$, so that the average voltage is half of 50 in this example. If voltage $V_{ACT}$ subsequently rises from its first level of 50 to a higher level shown by the dotted pulses, the circuit of FIG. 8 reduces pulse length $t_p$ without changing cycle length $t_o$, so as to keep the average voltage $V_{ACT} \times t_p/t_o$ equal to $V_{ACT-REF}$.

In graph B, the larger capacitor C91 merely increases the cycle length $t_o'$. Then the circuit of FIG. 8 provides the pulse length $t_p'$ sufficiently long to achieve the same ratio $t_p'/t_o'$ as was needed in graph A to maintain the average voltage.

From the foregoing, it is now apparent that novel forms of a control system for an electronically commutated motor (ECM), novel methods of operating an ECM, novel ECMs, novel laundering apparatus, novel systems for controlling the average voltage cyclically applied to a load, novel methods of controlling the average voltage cyclically applied to a load, and novel methods of controlling the average voltage cyclically applied to an ECM have been disclosed for accomplishing the objects set forth hereinbefore, as well as others, and that changes as to the precise arrangements, shapes, details and connections of the component parts, as well as the steps of methods, may be made by those having ordinary skill in the art without departing from the spirit of the invention or the scope thereof as set out in the claims which follow.

What is claimed is:

1. A control system for an electronically commutated motor adapted to be energized from a DC power source and including a stationary assembly having a plurality of winding stages adapted to be electronically commutated in at least one preselected sequence, and a rotatable assembly associated in selective magnetic coupling relation with the winding stages, each winding stage having a terminal associated therewith, the control system comprising:

first means operable for electronic and energization commutation of at least one at a time of the winding stages of the electronically commutated motor by applying thereto a DC voltage from the power source in the at least one preselected sequence to effect the energization of the electronically commutated motor and the rotation of the rotatable assembly, at least one unenergized other of the winding stages during any one commutation exhibiting a terminal voltage including a back emf and a field collapse voltage ending prior to appearance of the back emf; and second means for receiving and integrating the terminal voltage in response to its first approach to zero at the ending of the field collapse voltage and effecting the operation of said electronic commutation means when a predetermined level is reached in the integrating.

2. The control system claimed in claim 1 wherein said second means for receiving, integrating and effective comprises:

third means operable generally for receiving and integrating the terminal voltage;

means, responsive to a predetermined output level of said third means, for generating a commutation signal; and fourth means responsive to the commutation signal for effecting the operation of said electronic commutation means and for inhibiting the operation of said third means for a predetermined length of time after a commencement of commutation and before the ending of the field collapse voltage and for initiating the operation of said third means when the terminal voltage first approaches zero after the predetermined length of time and at the end of the field collapse voltage.

3. The control system claimed in claim 2 wherein said integrating third means operates so as to ignore the terminal voltage when the terminal voltage has a polarity opposite to the field collapse voltage, and the commutation signal terminates the same commutation period as the commutation period during which the ending of the field collapse voltage occurred and initiated the operation of said third means so as to result in the communication signal.

4. A control system for an electronically commutated motor adapted to be energized from a DC power source and including a stationary assembly having a plurality of winding stages adapted to be electronically commutated in at least one preselected sequence, and a rotatable assembly associated in selective magnetic coupling relation with the winding stages, each winding stage having a terminal associated therewith, the control system comprising:

electronic commutation means operable generally for electronic commutation of at least some of the winding stages of the electronically commutated motor by applying thereto a DC voltage from the power source in the at least one preselected sequence to effect the energization of the electronically commutated motor and the rotation of the rotatable assembly;

receiving and integrating means operable generally for receiving and integrating the terminal voltage of at least one of the winding stages, the terminal voltage including at least the back emf of the at least one winding stage and a field collapse signal ending prior to appearance of the back emf;

commutation signal generating means responsive to a predetermined output lever of said integrating means for generating a commutation signal for a predetermined length of time, the predetermined length of time expiring before the ending of the field collapse signal; and means responsive to the commutation signal for effecting the operation of said electronic commutation means and for inhibiting the operation of said integrating means for the predetermined length of time and intiating the operation of said integrating means when the terminal voltage of the at least one winding stage first approaches zero after the predetermined length of time.

5. The control system as set forth in claim 4 wherein said receiving and integrating means comprises at least one electronically controlled switch means for receiving the terminal voltage, said electronically controlled switch means being controlled in its opening and closing by said means for effecting, inhibiting and initiating thereby to inhibit and initiate the integrating.

6. The control system as set forth in claim 4 wherein the means for effecting, inhibiting and initiating comprises flip-flop means for coupling with said integrating means, and comparator means for coupling with an input of said flip-flop means and responsive to the terminal voltage to initiate integration when the terminal voltage approaches zero.

7. The control system as set forth in claim 6 wherein said flip-flop means has a second input coupled to said commutation signal generating means so as to inhibit integration upon occurrence of the commutation signal.

8. A control system for an electronically commutated motor adapted to be energized from a DC power source and including a stationary assembly having a plurality of winding stages adapted to be electronically commutated in at least one preselected sequence, and a rotatable assembly associated in selective magnetic coupling relation with the winding stages, each winding stage having a terminal associated therewith, the control system comprising:

means operable generally for electronic commutation and energization of at least one at a time of the winding stages of the electronically commutated motor by applying thereto a DC voltage from the power source in the at least one preselected sequence to effect the energization of the electronically commutated motor and the rotation of the rotatable assembly, at least one unenergized other of the winding stages during any one commutation exhibiting a terminal voltage including a back emf and a field collapse voltage ending prior to appearance of the back emf;

integrating means operable generally for integrating the terminal voltage of the at least one unenergized winding stages during any one commutation;

means responsive to a predetermined output level of said integrating means for generating commutation signal for effecting the operation of said electronic commutation means;

controlling means for controlling said integrating means, said controlling means being responsive to the commutation signal to disable said integrating means; and comparing means for comparing the field collapse voltage with a predetermined level and, upon the field collapse voltage falling below the predetermined level, causing said controlling means to enable the operation of said integrating means.

9. The control system as set forth in claim 8 wherein said controlling means includes flip-flop means for connection to said integrating means to prevent integration at least during a predetermined length of time, the predetermined length of time expiring prior to the ending of the field collapse voltage.

10. The control system as set forth in claim 9 wherein said comparing means incudes means for initiating the operation of said integrating means substantially when the terminal voltage first approaches zero after the predetermined length of time, the output of said operation intiating means being connected to an input of said flip-flop means to initiate integration.

11. The control system as set forth in claim 10 wherein the field collapse voltage has a peak value, the predetermined level for said comparing means being at least equal to a preselected percentage of the peak value.

12. The control system as set forth in claim 8 further including an electronically controlled switch having one input for each winding stage, each input being connected to its respective winding stage, and having at least two outputs, and logic circuit means being programmed to control said electronically controlled switch so that one output represents a neutral voltage and a second output represents the terminal voltage of the one of the windings.

13. A method of operating an electronically commutated motor adapted to be energized from a DC power source and including a stationary assembly having a plurality of winding stages adapted to be electronically commutated in at least one preselected sequence, and a rotatable assembly associated in selective magnetic coupling relation with the winding stages, each winding stage having a terminal associated therewith, the method comprising the steps of:

commutating in response to a commutating signal at least some of the winding stages by applying a DC voltage thereto in the at least one preselected sequence to effect the energization of the electronically commutated motor and the rotation of the rotatable assembly;

generally integrating the terminal voltage of at least one of the winding stages, the terminal voltage including at least the back emf of the at least one winding stage and also including a field collapse voltage ending prior to appearance of the back emf;

generating the commutation signal when the integrating reaches a predetermined level; and initiating the integrating in response to a first approach to zero at the ending of the field collapse voltage.

14. The method as set forth in claim 13 comprising the intermediate steps of:

inhibiting the integrating for a predetermined length of time after the commutation of the at least some winding stages and prior to the initiating step; and ignoring any part of the terminal voltage opposite in polarity to the field collapse voltage during the integrating.

15. The method as set forth in claim 14 comprising the preliminary step of programming a logic circuit to supply an inhibit signal for the predetermined length of time after receipt of the commutation signal.

16. The method as set forth in claim 14 wherein the predetermined length of time is between approximately 50 microseconds and approximately 100 microseconds.

17. The method as set forth in claim 16 wherein the predetermined length time is approximately 70 microseconds.

18. An electronically commutated motor adapted to be energized from a DC power source comprising:
a stationary assembly having a plurality of winding stages adapted to be electronically commutated in at least one preselected sequence;
a rotatable assembly associated in selective magnetic coupling relation with said winding stages; and
a control system including:
electronic commutation means operable generally for electronic commutation of at least some of the winding stages of the electronically commutated motor by applying thereto a DC voltage from the power source in the at least one preselected sequence to effect the energization of the electronically commutated motor and the rotation of said rotatable assembly;
integrating means operable generally for integrating a voltage across an unenergized one of the winding stages in each commutation period, the unenergized winding voltage including a back emf and a field collapse voltage ending prior to the back emf; and
effecting and preventing means responsive to a predetermined output level of said integrating means for effecting the operation of said electronic commutation means and for preventing the operation of said integrating means after the commencement of commutation of said at least some winding stages until the ending of the field collapse signal.

19. The electronically commutated motor as set forth in claim 18 wherein said effecting and preventing means comprises means for generating a commutation signal in response to the predetermined output level of said integrating means and electronic means responsive to the commutation signal for effecting the operation of said electronic commutation means and responsive to the field collapse signal for preventing the operation of said integrating means only until the ending of the field collapse signal.

20. The electronically commutated motor as set forth in claim 18 wherein the unenergized winding voltage is connected through at least one electronically controlled switch to said integrating means, an output of said effecting and preventing means being connected to said electronically controlled switch to control its opening and closing.

21. The electronically commutated motor as set forth in claim 18 wherein said effecting and preventing means includes means responsive to the predetermined output level of said integrating means for generating a commutation signal, and a logic circuit under programmed control, said logic circuit having as one input the output of said commutation signal generating means and being programmed to supply an inhibit signal for a predetermined length of time after receipt of the commutation signal.

22. The electronically commmutated motor as set forth in claim 21 further including an electronically controlled switch having one input for each winding stage, each input being connected to its respective winding stage, and having at least two outputs, said logic circuit being programmed to control said electronically controlled switch so that one output represents a neutral voltage and another output represents a terminal voltage of said unenergized one winding stage, said integrating means being coupled to said winding stages by said electronically controlled switch.

23. The electronically commutated motor as set forth in claim 21 wherein the predetermined length of time is between approximately 50 microseconds and approximately 100 microseconds.

24. The electronically commutated motor as set forth in claim 23 wherein the predetermined length of time is approximately 70 microseconds.

25. A laundering apparatus comprising in combination:
agitating and spinning means for agitating fluid and fabrics to be laundered thereby to launder the fabrics and for thereafter spinning the fabrics to effect centrifugal displacement of fluid from the fabrics;
an electronically commutated motor adapted to be energized from a DC power source, said motor comprising a stationary assembly having a plurality of winding stages adapted to be electronically commutated in at least one preselected sequence, each winding stage having a terminal associated therewith, and rotatable assembly means associated in selective magnetic coupling relation with said winding stages for driving said agitating and spinning means;
a control system connected to said motor; and
means for applying a DC voltage to said control system;
said control system including:
electronic commutation means operable generally for electronic commutation of at least some of said winding stages of said electronically commutated motor by applying the DC voltage thereto in the at least one preselected sequence to effect the energization of said electronically commutated motor and the rotation of said rotatable assembly means;
integrating means operable generally for integrating the terminal voltage of at least one of said winding stages, the terminal voltage including at least the back emf of said at least one winding stage and a field collapse signal ending prior to appearance of the back emf;
commutation signal generating means responsive to a predetermined output level of said integrating means for generating a commutation signal for a predetermined length of time, the predetermined length of time expiring before the ending of the field collapse signal;
effecting and inhibiting means responsive to the commutation signal for effecting the operation of said electronic commutation means and for inhibiting the operation of said integrating means for the predetermined length of time; and
initiating means for initiating the operation of said integrating means when the terminal voltage of said at least one winding stage at least first approaches zero after the predetermined length of time.

26. The laundering apparatus as set forth in claim 25 wherein said effecting and inhibiting means is a logic circuit under programmed control, said logic circuit having as one input the output of said commutation signal generating means and being programmed to supply an inhibit signal for the predetermined length of time after receipt of the commutation signal.

27. The laundering apparatus as set forth in claim 26 further including an electronically controlled switch having one input for each winding stage, each input being connected to its respective winding stage, and having at least two outputs, one output representing a neutral voltage and one output representing the voltage of said at least one winding stage, said logic circuit being programmed to control said electronically controlled switch to provide the terminal voltage of said at least one winding stage to said integrating means and to said initiating means.

28. The laundering apparatus as set forth in claim 25 wherein the predetermined length of time is between approximately 50 microseconds and approximately 100 microseconds.

29. The laundering apparatus as set forth in claim 28 wherein the predetermined length of time is approximately 70 microseconds.

30. A control system for an electrically commutated motor adapted to be energized from a DC power source and including a stationary assembly having a plurality of winding stages adapted to be electronically commutated in at least one preselected sequence, and a rotatable assembly associated in selective magnetic coupling relation with the winding stages, each winding stage having a terminal associated therewith, the control system comprising:
  means operable generally for effecting the electronic commutation of at least some of the winding stages of the electronically commutated motor by applying thereto a DC voltage from the power source in the at least one preselected sequence to effect the energization of the electronically commutated motor and the rotation of the rotatable assembly whereby a motoring condition is achievable;
  integrating means operable generally for integrating the terminal voltage of at least one of the winding stages the terminal voltage having a higher magnitude portion followed by a lower magnitude back emf portion under the motoring condition;
  means responsive to a predetermined output level of said integrating means for generating a commutation signal; and
  inhibiting means for inhibiting the operation of said integrating means until the terminal voltage of the at least one winding stage falls in magnitude below a selected level selected to exceed that of the back emf under the motoring condition.

31. The control system as set forth in claim 30 wherein the inhibiting means includes a comparator having one input being coupled to the terminal voltage, another input connected to an electrical reference, and an output connected to an enable input of the integrating means.

32. The control system as set forth in claim 31 wherein the reference is derived from the DC voltage.

33. A system for controlling the average voltage cyclically applied to a load comprising:
  function generating means for generating a direct function of the applied voltage;
  comparing means for comparing the function of the applied voltage to an electrical reference and for indicating when the function reaches the reference;
  voltage cycle signaling means for signaling the end of each voltage cycle when the function of the applied voltage reaches a predetermined value; and
  terminating means responsive to said comparing means and to said signaling means for terminating application of voltage to the load when the function of the applied voltage reaches the reference and for terminating each voltage cycle when the function of the applied voltage reaches the predetermined value.

34. The system as set forth in claim 33 wherein the function generating means provides an output that approximates said integral of the applied voltage.

35. The system as set forth in claim 34 wherein said function generating means includes a series resistor-capacitor circuit.

36. The system as set forth in claim 35 wherein said series resistor-capacitor circuit includes a low precision capacitor.

37. The system as set forth in claim 33 further including a logic circuit under programmed control for supplying the reference for said comparing means, the reference being changeable by said logic circuit.

38. The system as set forth in claim 37 wherein said logic circuit also includes an output for supplying a current reference, said system further including means for comparing the load current with the current reference, said terminating means being responsive to the load current exceeding the current reference to terminate the external application of voltage to the load.

39. The system as set forth in claim 33 wherein said terminating means includes a latch having a clock input connected to said voltage cycle signaling means and a reset input connected to said comparing means.

40. The system as set forth in claim 39 further including an electronically controlled switch means for connecting the output of said comparing means to the reset input of said latch, said electronically controlled switch means having an input connected to an output of said latch.

41. The system as set forth in claim 33 further including means connected to the output of said voltage cycle at the end of each cycle.

42. A method of controlling the average voltage cyclically applied to a load, comprising the steps of:
  generating a direct function of the applied voltage;
  terminating application of voltage to the load when the function of the applied voltage reaches a first predetermined value selected to represent a desired average voltage; and
  terminating each voltage cycle when the function of the applied voltage reaches a second predetermined value.

43. The method as set forth in claim 42 wherein the generated function approximates the integral of the applied voltage.

44. The method as set forth in claim 42 including the further step of programming a logic circuit to supply the first predetermined value to a comparing circuit, the first value being changeable by the logic circuit.

45. The method as set forth in claim 42 wherein the voltage causes a current to flow in the load and the method includes the further step of terminating the external application of voltage to the load when the load current exceeds a current reference, the current reference being set by a logic circuit under programmed control.

46. A control system for an electronically commutated DC motor having a stationary assembly with a plurality of winding stages and a rotatable assembly arranged in selective magnetic coupling relation therewith, the control system comprising:

means responsive to a set of control signals for commutating the winding stages by cyclically applying a DC voltage thereto in at least one preselected sequence to cause rotation of the rotatable assembly;

function generating means for generating a direct function of the applied voltage;

comparing means for comparing the function of the applied voltage to a reference and for indicating when the function reaches the reference;

cycle signaling means for signaling the end of each voltage cycle when the function of the applied voltage reaches a predetermined value; and terminating means responsive to said comparing means and to said signaling means for terminating application of voltage to the motor when the function of the applied voltage reaches the reference and for terminating each voltage cycle when the function of the applied voltage reaches the predetermined value.

47. The control system as set forth in claim 46 wherein said function generating means provides an output that approximates the integral of the applied voltge.

48. The control system as set forth in claim 47 wherein said function generating means includes a series resistor-capacitor circuit.

49. The control system as set forth in claim 48 wherein said resistor-capacitor circuit includes a low precision capacitor.

50. The control system as set forth in claim 46 further including a logic circuit under programmed control for supplying the reference for said comparing means, the reference being changeable by said logic circuit.

51. The control system as set forth in claim 50 wherein said logic circuit also includes an output for supplying a current reference, said control system further including means for comparing the motor current with the current reference, said terminating means being responsive to the motor current exceeding the current refrence to terminate application of voltage to the motor.

52. The control system as set forth in claim 46 wherein said terminating means includes a latch whose clock input is connected to said cycle signaling means and whose reset input is connected to said comparing means.

53. The control system as set forth in claim 52 further including electronic means for connecting the output of said comparing means to the reset input of said latch, said electronic means having an input terminal coupled to an output of said latch whereby the output of said latch is reset at the end of each voltage cycle.

54. The control system as set forth in claim 46 further including means connected to said cycle signaling means for resetting said function generating means at the end of each voltage cycle.

55. A method of controlling the average voltage cyclically applied to an electronically commutated motor, comprising the steps of:
generating a direct function of the applied voltage;
terminating application of voltage to the motor when the function of the applied voltage reaches a first predetermined value selected to represent a desired average voltage; and
terminating each voltage cycle when the function of the applied voltage reaches a second predetermined value.

56. The method as set forth in claim 55 wherein the generated function approximates the integral of the applied voltage.

57. The method as set forth in claim 55 including the further step of programming a logic circuit to supply the first predetermined value to a comparing circuit, the first value being changeable by the logic circuit.

58. The method as set forth in claim 55 including the further step of terminting the external application of voltage to the motor when the motor current exceeds a current reference, the current reference being set by a logic circuit under programmed control.

59. A laundering apparatus comprising in combination:

agitating and spinning means for agitating fluid and fabrics to be laundered thereby to launder the fabrics and for thereafter spinning the fabrics to effect centrifugal displacement of fluid from the fabrics;

an electronically commutated motor, said motor comprising a stationary assembly having a plurality of winding stages adapted to be electronically commutated in at least one preselected sequence, and rotatable assembly means associated in selective magnetic coupling relation with said winding stages for driving said agitating and spinning means;

a control system: connected to said motor; and means for applying a DC voltage to said control system;

said control system including:

means operable generally for effecting the electronic commutation of at least some of said winding stages of said electronically commutated motor by applying the DC voltage thereto in the at least one preselected sequence to effect the energization of said electronically commutated motor and the rotation of said rotatable assembly means;

function generating means for generating a function of the applied voltage;

comparing means for comparing the function of the applied voltage to a reference and for indicating when the function reaches the reference;

cycle signaling means for signaling the end of each voltage cycle when the function of the applied voltage reaches a predetermined value; and terminating means responsive to said comparing means and to said cycle signaling means for terminating application of voltage to said motor when the function of the applied voltage reaches the reference and for terminating each voltage cycle when the function of the applied voltage reaches the predetermined value.

60. The laundering apparatus as set forth in claim 59 wherein said the function generating means provides an output that approximat the integral of the applied voltage.

61. The laundering apparatus as set forth in claim 60 wherein said function generating means includes a series resistor-capacitor circuit.

62. The laundering apparatus as set forth in claim 61 wherein said series resistor-capacitor circuit includes a low wherein said series resistor-capacitor circuit includes a low precision capacitor.

63. The laundering apparatus as set forth in claim 59 further including a logic circuit under programmed control for supplying the reference for said comparing means, the reference being changeable by said logic circuit.

64. The laundering apparatus as set forth in claim 63 wherein said logic circuit also includes an output for supplying a current reference, said control system further including means for comparing the motor current with the current reference, said terminating means being responsive to the motor current exceeding the current reference to terminate the external application of voltage to the motor.

65. The laundering apparatus as set forth in claim 59 further including means connected to the output of said cycle signaling means for rapidly resetting said function generating means at the end of each voltage cycle.

66. A control system for an electronically commutated motor adapted to be energized from a DC power source and including a stationary assembly having a plurality of winding stages adapted to be electronically commutated in at least one preselected sequence, and a rotatable assembly associated in selective magnetic coupling relation with the winding stages, each winding stage having a terminal associated therewith, the control system comprising:

electronic commutation means operable for electronic commutation of at least one at a time of the winding stages of the electronically commutated motor by applying thereto a DC voltage from the power source in the at least one preselected sequence to effect the energization of the electronically commutated motor and the rotation of the rotatable assembly, at least one other of the winding stages during any one commutation exhibiting a terminal voltage including a back emf and a field collapse voltage ending prior to appearance of the back emf; and means for generating a direct function of the terminal voltage during each commutation in response to its first approach to zero at the ending of the field collapse voltage and effecting the operation of said electronic commutation means when the direct function of the terminal voltage thereafter reaches a predetermined level during each same commutation.

67. The control system as set forth in claim 66 for an electronically commutated motor having only three winding stages wherein said commutation means comprises means operable for electronic commutation of pairs of the winding stages of the electronically commutated motor by applying a DC voltage from the power source to pairs of the terminals of the winding stages in the at least one preselected sequence to effect the energization of the electronically commutated motor and the rotation of the rotatable assembly, the third winding stage during any one commutation exhibiting the terminal voltage including the back emf and the field collapse voltage ending prior to appearance of the back emf.

68. A control system for an electronically commutated motor adapted to be energized from a DC power source and including a stationary assembly having a plurality of winding stages adapted to be electronically commutated in at least one preselected sequence, and a rotatable assembly associated in selective magnetic coupling relation with the winding stages, each winding stage having a terminal associated therewith, the control system comprising:

commutation means operable for electronic commutation of at least one at a time of the winding stages of the electronically commutated motor by applying thereto a DC voltage from the power source in the at least one preselected sequence to effect the energization of the electronically commutated motor and the rotation of the rotatable assembly; and means connected to said commutation means for causing said commutation means to apply the DC voltage during each commutation in pulse width modulated cycles, including means for supplying a reference voltage which is independent of the DC voltage and further including an oscillator circuit having a resistor connected to a capacitor that is charged from the DC voltage, said oscillator circuit having a cycle time which approximately equals the length of time in which a current flowing between said resistor and said capacitor causes the voltage across said capacitor to reach a second voltage, and means for signalling said commutation means to apply the DC voltage to the winding stages in any one cycle only until the capacitor voltage reaches the reference voltage, so that the average voltage of the pulse width modulated cycles is substantially independent of the capacitance of said capacitor.

69. The control system as set forth in claim 68 further comprising means for deriving the second voltage as a predetermined fraction of the DC voltage from which said capacitor is charged so that the cycle time of said oscillator circuit is substantially independent of the magnitude of the DC voltage.

70. The control system as set forth in claim 69 wherein said oscillator circuit further has means for comparing the voltage across said capacitor to the second voltage, and upon the voltage across said capacitor reaching the second voltage, resetting the voltage across said capacitor to begin another voltage cycle.

71. The control system as set forth in claim 68 wherein said means for supplying the reference voltage comprises a digital computer and a digital-to-analog converter.

72. The control system as set forth in claim 68 wherein said means for signalling said commutation means comprises means for comparing the voltage across said capacitor to the reference voltage and, upon the voltage across said capacitor reaching the reference voltage, terminating application of voltage to the motor until the next cycle of said oscillator circuit.

73. The control system as set forth in claim 68 wherein said means for signalling said commutation means comprises a latch connected to said oscillator circuit for producing an output which is set to a first logic level at the end of each cycle and, upon the voltage across said capacitor reaching the reference voltage, reset to a complementary logic level, the output of said latch being connected to the commutation means so that said commutation means is caused to apply the DC voltage only when the latch output is at the first logic level.

74. The control system as set forth in claim 73 further comprising electronically controlled switch means connected to the output of said latch for resetting said latch just prior to the end of each cycle if it has not already been reset during the same cycle.

75. A laundering apparatus comprising in combination:

agitating and spinning means for agitating water and fabrics to be laundered thereby to launder the fabrics and for thereafter spinning the fabrics to effect centrifugal displacement of fluid from the fabrics;

an electrically commutated motor, said motor comprising a stationary assembly having a plurality of winding stages adapated to be electrically commutated in at least one preselected sequence, and rotatable assembly means associated in selective magnetic coupling relation with said winding stages for driving said agitating and spinning means;

commutation means operable generally for effecting the electronic commutation of at least some of said winding stages of said electronically commutated motor by applying a DC voltage thereto in the at least one preselected sequence to effect the energization of said electronically commutated motor and the rotation of said rotatable assembly; and means connected to said commutation means for causing said commutation means to apply the DC voltage during each commutation in pulse width modulated cycles, including means for supplying a reference voltage which is independent of the DC voltage and further including an oscillator circuit having a resistor connected to a capacitor that is charged from the DC voltage, said oscillator circuit having a cycle time which approximately equals the length of time in which a current flowing between said resistor and said capacitor causes the voltage across said capacitor to reach a second voltage, and means for signalling said commutation means to apply the DC voltage to said winding stages in any cycle only until the capacitor voltage reaches the reference voltate, so that the average voltage of the pulse width modulated cycles is substantially independent of the capacitance of said capacitor.

76. The laundering apparatus as set forth in claim 75 further comprising means for deriving the second voltage as a predetermined fraction of the DC voltage from which said capacitor is charaged so that the cycle time of said oscillator circuit is substantially independent of the magnitude of the DC voltage.

77. The laundering apparatus as set forth in claim 76 wherein said oscillator circuit further has means for comparing the voltage across said capacitor to the second voltage and upon the voltage across said capacitor reaching the second voltage, resetting the voltage across said capacitor to begin another voltage cycle.

78. The laundering apparatus as set forth in claim 75 wherein said means for supplying a reference voltage comprises a digital computer and a distal-to-analog converter.

79. The laundering apparatus as set forth in claim 75 wherein said means for signalling said commutation means comprises means for comparing the voltage across said capacitor to the reference voltage and, upon the voltage across said capacitor reaching the reference voltage, terminating application of voltage to said electronically commutated motor until the next cycle of said oscillator circuit.

80. The laundering apparatus as set forth in claim 75 wherein said means for signalling said commutation means comprises a latch connected to said oscillator circuit for producing an output which is set to a first logic level at the end of each cycle and, upon the voltage across said capacitor reaching the reference voltage, reset to a complementary logic level, the output of said latch being connected to said commutation means so that said commutation means is caused to apply the DC voltage only when the latch output is at the first logic level.

81. The laundering apparatus as set forth in claim 80 further comprising electronically controlled switch means connected to the output of said latch for resetting said latch just prior to the end of each cycle if it has not already been reset during the same cycle.

82. A laundering apparatus comprising in combination:

agitating and spinning fluid means for agitating and fabrics to be laundered thereby to launder the fabrics and for thereafter spinning the fabrics to effect centrifugal displacement of fluid from the fabrics;

an electrically commutated motor, said motor comprising a stationary assexbly having a plurality of winding stages adapted to be electronically commutated in at least one preselected sequence, and rotatable assembly means associated in selective magnetic coupling relation with said winding stages for driving said agitating and spinning means;

commutation means operable generally for effecting the electronic commutation of at least some of said winding stages of said electronically commutated motor by applying a DC voltage thereto in the at least one preselected sequence to effect the energization of said electrically commutated motor and the rotation of said rotatable assembly; and means connected to said commutation means for causing said commutation means to apply the DC voltage during each commutation in pulse width modulated cycles, including a logic circuit for supplying a reference voltage which is independent of the DC voltage, a resistor connected in series with a capacitor that is charged from the DC voltage through said resistor, means connected to the same DC voltage for deriving another voltage value which is a predetermined fraction of the same DC voltage from which said capacitor is charged, comparing means for controllably discharging said capacitor to begin another cycle upon the voltage across said capacitor reaching the other voltage value, and signalling means for signalling said commutation means to apply the DC voltage to said winding stages in any one cycle only until the capacitor charges to the reference voltage, so that the average voltage of the pulse width modulated cycles is substantially independent of variations in the DC voltage and substantially independent of the capacitance of said capacitor.

83. The laundering apparatus as set forth in claim 82 further comprisng a second resistor connected between said capacitor and said first-named resistor, said deriving means including first, second, and third voltage divider resistors connected in series across said DC voltage, and said comparing means including a first comparator having a first input connected to said capacitor to sense the capacitor voltage, a second input connected to the junction of said first and second voltage divider resistors, and an output connected by a diode to the junction of said second and third voltage divider resistors, said comparing means further including a second comparator having a first input connected to the output of said first comparator, a second input supplied with a second reference voltage, and an output connected to the junction of said first-namsd resistor and said second resistor through which said capacitor is charged.

84. The laundering apparatus as set forth in claim 83 wherein said signalling means includes a third comparator having a first input connected to the reference voltage supplying circuit, a second input connected to said capacitor, and an output, and further includes a latch having a clock input connected to said first comparator output, a reset input connected to said third comparator output, and an output connected to said commutation means.

85. The laundering apparatus as set forth in claim 84 further comprising means for comparing the current flowing in said winding stages of said electronically commutated motor with another reference voltage from said logic circuit, said current comparing means having an output connected to said reset input of said latch.

86. A laundering apparatus comprising in combination:
   agitating and spinning means for agitating fluid and fabrics to be laundered thereby to launder the fabrics and for thereafter spinning the fabrics to effect centrifugal displacement of fluid from the fabrics;
   an electronically commutated motor comprising a stationary assembly having a plurality of winding stages adapted to be electronically commutated in at least one preselected sequence, and rotatable means associated in selective mgnetic coupling relation with said winding states for driving said agitating and spinning means;
   electronic commutation means operable generally for effecting the electronic commutation of at least some of said winding stages of said electronically commutated motor by applying a DC voltage thereto in the at least one preselected sequence to effect the energization of said electronically commutated motor and the rotation of said rotatable means, at least one of said winding stages during any one commutation exhibiting a terminal voltage including a back emf and a field collapse voltage ending prior to appearance of the back emf; and
   generating means for generating a function of the terminal voltage during each commutation in response to its first approach to zero at the ending of the field collapse voltage and thereafter effecting the operation of said electronic commutation means when the function of the terminal voltage reaches a predetermined level during each same commutation.

87. The laundering apparatus as set forth in claim 86 wherein said generating means includes integrating means for integrating the terminal voltage in response to its first approach to zero at the ending of the field collapse voltage and effecting the operation of said electronic commutation means when the predetermined level is reached in the integrating.

88. The laundering apparatus as set forth in claim 87 wherein said integrating means includes means for preventing the terminal voltage from affecting the integrating when the terminal voltage has a polarity opposite to the field collapse voltage.

89. The laundering apparatus as set forth in claim 86 wherein said winding stages have at least one terminal each and said commutation of at least two of said winding stages at a time by applying the DC voltage to said terminals thereof in the at least one preselected sequence to effect the energization of said electronically commutated motor and the rotation of said rotatable means.

* * * * *